(12) United States Patent
Raslambekov

(10) Patent No.: US 11,116,606 B1
(45) Date of Patent: Sep. 14, 2021

(54) SYSTEMS AND METHODS FOR DETERMINING A JAW CURVE

(71) Applicant: Oxilio Ltd, Larnaca (CY)

(72) Inventor: Islam Khasanovich Raslambekov, Long Island City, NY (US)

(73) Assignee: Arkimos Ltd., Larnaca (CY)

(*) Notice: Subject to any disclaimer, the term of this patent is extended or adjusted under 35 U.S.C. 154(b) by 0 days.

(21) Appl. No.: 17/143,067

(22) Filed: Jan. 6, 2021

(51) Int. Cl.
*G06T 15/00* (2011.01)
*A61C 7/00* (2006.01)
*A61C 9/00* (2006.01)
*G06T 17/20* (2006.01)

(52) U.S. Cl.
CPC ............ *A61C 7/002* (2013.01); *A61C 9/0046* (2013.01); *G06T 17/20* (2013.01); *G06T 2210/41* (2013.01)

(58) Field of Classification Search
CPC ..................... G06T 7/38; G06T 7/0012; G06T 2207/10081; G06F 19/00
USPC .......................................................... 345/418
See application file for complete search history.

(56) References Cited

U.S. PATENT DOCUMENTS

| | | |
|---|---|---|
| 5,975,893 A | 11/1999 | Chishti et al. |
| 6,183,248 B1 | 2/2001 | Chishti et al. |
| 6,227,850 B1 | 5/2001 | Chishti et al. |
| 6,309,215 B1 | 10/2001 | Phan et al. |
| 6,318,994 B1 | 11/2001 | Chishti et al. |
| 6,334,853 B1 | 1/2002 | Kopelman et al. |
| 6,386,878 B1 | 5/2002 | Pavlovskaia et al. |
| 6,398,548 B1 | 6/2002 | Muhammad et al. |
| 6,463,344 B1 | 10/2002 | Pavloskaia et al. |
| 6,471,511 B1 | 10/2002 | Chishti et al. |
| 6,554,611 B2 | 4/2003 | Shishti et al. |
| 6,602,070 B2 | 8/2003 | Miller et al. |
| 6,665,570 B2 | 12/2003 | Pavloskaia et al. |

(Continued)

FOREIGN PATENT DOCUMENTS

| | | |
|---|---|---|
| CN | 110164558 A | 8/2019 |
| WO | 98058596 A1 | 12/1998 |

(Continued)

OTHER PUBLICATIONS

Yuan T, Wang Y, Hou Z, Wang J. Tooth segmentation and gingival tissue deformation framework for 3D orthodontic treatment planning and evaluating. Medical & Biological Engineering & Computing. Jul. 22, 2020.*

(Continued)

*Primary Examiner* — Phu K Nguyen
(74) *Attorney, Agent, or Firm* — BCF LLP

(57) ABSTRACT

A method for determining a jaw curve for orthodontic treatment planning for a patient, the method being executable by a processor. The method includes obtaining a tooth and gingiva mesh from image data associated with teeth and surrounding gingiva of the patient, the mesh being representative of a surface of the teeth and the surrounding gingiva; obtaining a tooth contour of each tooth, the tooth contour being defined by a border between a visible portion of each tooth and the surrounding gingiva; determining a tooth contour center of each tooth, the tooth contour center of a given tooth being an average point of the tooth contour of the given tooth; projecting the tooth contour center of each tooth onto a jaw plane; and fitting the tooth contour center of each tooth to a curve to determine the jaw curve.

13 Claims, 13 Drawing Sheets

(56) References Cited

U.S. PATENT DOCUMENTS

| | | |
|---|---|---|
| 6,685,470 B2 | 2/2004 | Chishti et al. |
| 6,688,886 B2 | 2/2004 | Hughes et al. |
| 6,705,863 B2 | 3/2004 | Phan et al. |
| 6,726,478 B1 | 4/2004 | Isiderio et al. |
| 6,739,870 B2 | 5/2004 | Lai et al. |
| 6,767,208 B2 | 7/2004 | Kaza |
| 6,846,179 B2 | 1/2005 | Chapoulaud et al. |
| 6,979,196 B2 | 12/2005 | Nikolskiy et al. |
| 7,040,896 B2 | 5/2006 | Pavlovskaia et al. |
| 7,059,850 B1 | 6/2006 | Phan et al. |
| 7,063,532 B1 | 6/2006 | Jones et al. |
| 7,123,767 B2 | 10/2006 | Jones et al. |
| 7,125,248 B2 | 10/2006 | Phan et al. |
| 7,134,874 B2 | 11/2006 | Chishti et al. |
| 7,220,122 B2 | 5/2007 | Chishti |
| 7,241,142 B2 | 7/2007 | Abolfathi et al. |
| 7,293,988 B2 | 11/2007 | Wen |
| 7,320,592 B2 | 1/2008 | Chishti et al. |
| 7,373,286 B2 | 5/2008 | Nikolskiy et al. |
| 7,377,778 B2 | 5/2008 | Chishti et al. |
| 7,428,481 B2 | 9/2008 | Nikolskiy et al. |
| 7,442,040 B2 | 10/2008 | Kuo |
| 7,637,740 B2 | 12/2009 | Knopp |
| 7,689,398 B2 | 3/2010 | Cheng et al. |
| 7,744,369 B2 | 6/2010 | Imgrund et al. |
| 7,771,195 B2 | 8/2010 | Knopp et al. |
| 7,826,646 B2 | 11/2010 | Pavlovskaia et al. |
| 7,841,858 B2 | 11/2010 | Knopp et al. |
| 7,844,429 B2 | 11/2010 | Matov et al. |
| 7,865,259 B2 | 1/2011 | Kuo et al. |
| 7,904,307 B2 | 3/2011 | Abolfathi et al. |
| 7,905,725 B2 | 3/2011 | Chishti et al. |
| 7,942,672 B2 | 5/2011 | Kuo |
| 7,993,134 B2 | 8/2011 | Wen |
| 8,038,444 B2 | 10/2011 | Kitching et al. |
| 8,044,954 B2 | 10/2011 | Kitching et al. |
| 8,108,189 B2 | 1/2012 | Chelnokov et al. |
| 8,131,393 B2 | 3/2012 | Matov et al. |
| 8,135,569 B2 | 3/2012 | Matov et al. |
| 8,244,390 B2 | 8/2012 | Kuo et al. |
| 8,425,229 B2 | 4/2013 | Nilsson et al. |
| 8,439,672 B2 | 5/2013 | Matov et al. |
| 8,465,280 B2 | 6/2013 | Sachdeva et al. |
| 8,478,435 B2 | 7/2013 | Kuo et al. |
| 8,512,037 B2 | 8/2013 | Andreiko |
| 8,639,477 B2 | 1/2014 | Chelnokov et al. |
| 8,641,414 B2 | 2/2014 | Borovinskih et al. |
| 8,651,859 B2 | 2/2014 | Chishti et al. |
| 8,734,150 B2 | 5/2014 | Wen |
| 8,780,106 B2 | 7/2014 | Chishti et al. |
| 8,807,999 B2 | 8/2014 | Kuo et al. |
| 8,896,592 B2 | 11/2014 | Boltunov et al. |
| 8,897,902 B2 | 11/2014 | See et al. |
| 8,961,173 B2 | 2/2015 | Miller |
| 9,060,829 B2 | 6/2015 | Sterental et al. |
| 9,107,722 B2 | 8/2015 | Matov et al. |
| 9,161,823 B2 | 10/2015 | Morton et al. |
| 9,211,166 B2 | 12/2015 | Kuo et al. |
| 9,326,831 B2 | 5/2016 | Cheang |
| 9,345,557 B2 | 5/2016 | Anderson et al. |
| 9,375,293 B2 | 6/2016 | Taub |
| 9,375,300 B2 | 6/2016 | Matov et al. |
| 9,414,897 B2 | 8/2016 | Wu et al. |
| 9,433,476 B2 | 9/2016 | Khardekar et al. |
| 9,529,970 B2 | 12/2016 | Andreiko |
| 9,592,103 B2 | 3/2017 | Taub et al. |
| 9,610,140 B2 | 4/2017 | Anderson et al. |
| 9,622,834 B2 | 4/2017 | Chapoulaud et al. |
| 9,767,223 B2 | 9/2017 | Fisker et al. |
| 9,792,413 B2 | 10/2017 | Badawi |
| 9,844,424 B2 | 12/2017 | Wu et al. |
| 10,011,050 B2 | 7/2018 | Kitching et al. |
| 10,052,180 B1 | 8/2018 | Richter |
| 10,076,389 B2 | 9/2018 | Wu et al. |
| 10,307,222 B2 | 6/2019 | Morton et al. |
| 10,332,164 B2 | 6/2019 | Abolfathi et al. |
| 10,368,814 B2 * | 8/2019 | Inglese ............... A61C 19/05 |
| 10,383,704 B2 | 8/2019 | Kitching |
| 10,405,947 B1 | 9/2019 | Kaza et al. |
| 10,405,951 B1 | 9/2019 | Kopelman et al. |
| 10,413,385 B2 | 9/2019 | Sherwood et al. |
| 10,433,934 B2 | 10/2019 | Kopelman |
| 10,463,452 B2 | 11/2019 | Matov et al. |
| 10,470,846 B2 | 11/2019 | Kopelman et al. |
| 10,492,892 B2 | 12/2019 | Somasundaram et al. |
| 10,524,880 B2 | 1/2020 | Wen |
| 10,553,309 B2 | 2/2020 | Trosien et al. |
| 10,561,476 B2 | 2/2020 | Matov et al. |
| 10,595,965 B2 | 3/2020 | Khardekar et al. |
| 10,617,489 B2 | 4/2020 | Grove et al. |
| 10,650,517 B2 | 5/2020 | Parpara et al. |
| 10,653,503 B2 | 5/2020 | Boltunov et al. |
| 10,783,629 B2 | 9/2020 | Parpara et al. |
| 10,792,127 B2 | 10/2020 | Kopelman et al. |
| 10,813,721 B2 | 10/2020 | Sterental et al. |
| 2005/0244791 A1 | 11/2005 | Davis et al. |
| 2013/0095446 A1 | 4/2013 | Andreiko et al. |
| 2014/0288894 A1 | 9/2014 | Chishti et al. |
| 2016/0302885 A1 | 10/2016 | Matov et al. |
| 2017/0035536 A1 | 2/2017 | Alvarez Garcia et al. |
| 2017/0079748 A1 | 3/2017 | Andreiko |
| 2018/0039755 A1 | 2/2018 | Matov et al. |
| 2018/0165818 A1 | 6/2018 | Tsai et al. |
| 2018/0304497 A1 | 10/2018 | Kitching et al. |
| 2019/0000592 A1 | 1/2019 | Cam et al. |
| 2019/0046295 A1 | 2/2019 | Morton et al. |
| 2019/0076214 A1 | 3/2019 | Nyukhtikov et al. |
| 2019/0175303 A1 | 6/2019 | Akopov et al. |
| 2019/0282333 A1 | 9/2019 | Matov et al. |
| 2019/0314117 A1 | 10/2019 | Morton et al. |
| 2019/0357997 A1 | 11/2019 | Shi et al. |
| 2019/0365514 A1 | 12/2019 | Hasan et al. |
| 2020/0000551 A1 | 1/2020 | Li et al. |
| 2020/0000552 A1 | 1/2020 | Mednikov et al. |
| 2020/0113649 A1 | 4/2020 | Lee et al. |
| 2020/0146776 A1 | 5/2020 | Matov et al. |
| 2020/0229900 A1 | 7/2020 | Cunliffe et al. |
| 2020/0297245 A1 | 9/2020 | Hultgren et al. |
| 2020/0297459 A1 | 9/2020 | Grove et al. |
| 2020/0306011 A1 | 10/2020 | Chekhonin et al. |
| 2020/0306012 A1 | 10/2020 | Roschin et al. |

FOREIGN PATENT DOCUMENTS

| | | | |
|---|---|---|---|
| WO | 00019928 A1 | 4/2000 | |
| WO | 00019930 A1 | 4/2000 | |
| WO | 00019931 A1 | 4/2000 | |
| WO | 00069356 A1 | 11/2000 | |
| WO | 0069357 A1 | 11/2000 | |
| WO | 01074268 A1 | 11/2001 | |
| WO | 2018085718 A2 | 5/2018 | |
| WO | 2019040927 A1 | 2/2019 | |
| WO | 2019089989 A2 | 5/2019 | |

OTHER PUBLICATIONS

Kumar "Automated Virtual Treatment Planning in Orthodontics: Modeling and Algorithms", Jul. 2012; A Dissertation Submitted to the Faculty of the Graduate School of the University of Minnesota.

\* cited by examiner

SYSTEMS AND METHODS FOR DETERMINING A JAW CURVE

The present technology relates to systems and methods for planning an orthodontic treatment for a patient, in general; and more specifically, to determining a jaw curve and determining tooth displacement of a subject's teeth.

BACKGROUND

In orthodontics, planning an orthodontic treatment for a subject may include determining movement of teeth of a subject's arch form. This may further include modeling tooth movements of a given tooth in the course of the planned orthodontic treatment: from an initial (current) position to a desired position of the given tooth, in some cases relative to an overall jaw curvature. Modeling the jaw curvature for a given patient is therefore sometimes of interest.

However, there are certain contrasting requirements related to the orthodontic treatment: (1) efficiency requirement—minimizing an overall duration of the orthodontic treatment, and (2) safety requirement—ensuring that the planned orthodontic treatment does not cause damage to the subject's teeth or other buccal anatomical structures through collisions.

Certain prior art approaches have been proposed to address the technical problem of modeling jaw curves for orthodontal treatment planning considering at least some of the above-identified requirements.

United States Patent Publication No.: 2020/0113649, published on Apr. 16, 2020, assigned to LaonPeople Inc., and entitled "Apparatus and Method for Generating Image of Corrected Teeth" discloses systems and methods generating an image of corrected teeth, including by generating dental curves to which the teeth are virtually aligned for producing the image of corrected teeth. The method disclosed includes generating dental curves (jaw curves), determining a position of reference teeth along the curve, determining and changing vector distance between the reference teeth and their adjacent teeth, and iteratively moving adjacent teeth until none of the teeth overlap in their final position. D1 further provides teaching of fitting dental curves with different polynomial fitting functions.

U.S. Pat. No. 8,651,859 B2 issued on Feb. 18, 2014, assigned to Align Technology Inc., and entitled "System for Determining Final Position of Teeth" discloses a system for modeling tooth movement when planning an orthodontic treatment, including an apparatus and method for generating a computer representation of a set of teeth. There is disclosed a method for modeling tooth movement and final placement utilizing local coordinates systems (frame of reference), as well as with a framework of maximum displacement steps U.S. Pat. No. 7,744,369 B2 issued on Jun. 29, 2010, assigned to Orametrix Inc., and entitled "Method and System for Enhanced Orthodontic Treatment Planning" discloses methods for determining final tooth positions for planning orthodontal treatments, including determining an arch form, aligning teeth to the determined arch form, and determining inter-tooth spacing. Determining the arch form includes mathematically fitting the curve to reference points on teeth, which can be done in part based on the positions of reference teeth.

SUMMARY

It is an object of the present technology to ameliorate at least some of the inconveniences present in the prior art.

The developers of the present technology have devised a method for determining a jaw curve of an arch form of a patient to be used in modeling tooth displacement. By determining tooth movement based at least in part on a determined jaw curve, the present technology could aid in determining tooth movement with a consideration for both the efficiency requirement of minimizing the overall duration of the orthodontic treatment of the subject; and the safety requirement aimed at preventing damages to the subject's teeth.

More specifically, the developers have appreciated that a jaw curve can be modeled by fitting a curve to center or average points of tooth contours. Further, the developers have realized that the safety requirement may be met if collisions between the given tooth and an adjacent tooth are minimized as the collisions therebetween may result in causing discomfort to the subject, or even teeth damage such as chips and cracks of the teeth enamel, for example. Thus, possible collisions of teeth can be predicted and avoided by determining a desired displacement of a primary tooth, and subsequently making displacements of one or more secondary adjacent teeth due to avoid collision with the desired displacement of the principal tooth, according to some implementations of the present technology. Therefore, these methods and systems could allow for determining more effective, efficient, and safer orthodontic treatments.

More specifically, according to a first broad aspect of the present technology, there is provided a method for determining a jaw curve for orthodontic treatment planning for a patient, the method being executable by a processor. The method includes obtaining a tooth and gingiva mesh from image data associated with teeth and surrounding gingiva of the patient, the mesh being representative of a surface of the teeth and the surrounding gingiva; obtaining a tooth contour of each tooth, the tooth contour being defined by a border between a visible portion of each tooth and the surrounding gingiva; determining a tooth contour center of each tooth, the tooth contour center of a given tooth being an average point of the tooth contour of the given tooth; projecting the teeth contour center of each tooth onto a jaw plane; and fitting the tooth contour center of each tooth to a curve to determine the jaw curve.

In some implementations, the method further includes determining at least one left anchor point and at least one right anchor point on the jaw plane; and fitting the curve to determine the jaw curve includes fitting the at least one left anchor point, the at least one right anchor point, and the tooth contour center of each tooth to determine the jaw curve.

In some implementations of the method, determining the at least one left anchor point includes: determining a left line segment extending through the tooth contour center of two rear-most, left teeth, the left line segment being projected in the jaw plane, and locating a left anchor point on the left line segment at a predetermined distance from a rear-most one of the two rear-most, left teeth; and determining the at least one right anchor point includes: determining a right line segment extending through the tooth contour center of two rear-most, right teeth, the right line segment being projected in the jaw plane, and locating a right anchor point on the right line segment at the predetermined distance from a rear-most one of the two rear-most, right teeth.

In some implementations of the method, the left anchor point is a first left anchor point; the right anchor point is a first right anchor point; determining the at least one left anchor point further includes: determining a second left anchor point on the left line segment, the second left anchor point being located at the predetermined distance rearward of the first left anchor point along the left line segment; and determining the at least one right anchor point further includes: determining a second right anchor point on the right line segment, the second right anchor point being located at the predetermined distance rearward of the first right anchor point along the right line segment.

In some implementations, the predetermined distance is 15 millimeters.

In some implementations of the method, obtaining the tooth and gingiva mesh includes receiving a scan of the teeth and surrounding gingiva of the patient to create the image data; and creating the tooth and gingiva mesh from the image data.

In some implementations, determining the tooth contour center includes determining an average point of the tooth contour.

In some implementations, fitting the at least one left anchor point, the at least one right anchor point, and the tooth contour center of each tooth to determine the jaw curve comprises determining the jaw curve based on a parametrical Hermite spline H(t).

In some implementations of the method, the jaw plane is defined parallel to an X-Y plane of a tooth coordinate system of each tooth.

In some implementations of the method, obtaining the tooth contour of each tooth comprises determining the tooth contour of each tooth; and determining the tooth contour of the teeth of the patient includes receiving a three-dimensional (3D) digital model of a representation of the teeth and the surrounding gingiva of the patient; defining, for each tooth of the teeth of the patient, plurality of curves, wherein each curve of the plurality of curves crosses the boundary between the teeth and the surrounding gingiva; determining, for each point of a plurality of points of each of the plurality of curves, an indication of curvature of the respective curve at each point; determining, for each point of the plurality of points and based on the indication of curvature corresponding to the respective point, a predicted likelihood parameter that each point corresponds to the boundary between the teeth and the surrounding gingiva; and selecting, for each curve of the plurality of curves, using a smoothing function and the predicted likelihood parameter, a single point, of the plurality of points, on the respective curve as a boundary point corresponding to a boundary between the teeth and the surrounding gingiva of the patient.

In some implementations, fitting the at least one left anchor point, the at least one right anchor point, and the tooth contour center of each tooth to determine the jaw curve comprises smoothing a line connecting the at least one left anchor point, the at least one right anchor point, and the tooth contour center of each tooth.

In some implementations of the method, further includes determining, in response to determining the jaw curve, an orthodontic treatment for the patient based at least in part on the determined jaw curve.

In some implementations, the method further includes displaying, on an interactive display system operatively connected to the processor, a model of the teeth and the surrounding gingiva of the patient, the model being based at least in part on the determined jaw curve, the model being configured to be manipulated by an operator of the interactive display system.

In some implementations, the method further includes determining, in response to manipulation of the model, an orthodontic treatment for the patient based at least in part on the model determined at least in part on the jaw curve.

In some implementations, the method further includes simulating movement of at least one tooth along the jaw curve.

In accordance with a second broad aspect of the present technology, there is provided a method for planning an orthodontic treatment for a patient including determining tooth movement, the method being executable by a processor. The method includes obtaining a tooth and gingiva mesh from image data associated with teeth and surrounding gingiva of the patient, the mesh being representative of a surface of the teeth and surrounding gums; selecting a primary tooth to be moved to a desired position; displacing a tooth mesh of the primary tooth by a basic step distance toward the desired position, displacement of the tooth mesh of the primary tooth being determined at least in part on a jaw curve obtained for the teeth of the patient; determining if the displaced primary tooth collides with at least one secondary tooth of the teeth in the desired position; in response to the displaced primary tooth colliding with the at least one secondary tooth, displacing a tooth mesh of the secondary tooth away from the tooth mesh of the primary tooth by the basic step distance; and repeating determination of tooth collisions and displacing tooth contours of colliding teeth until no teeth of the teeth of the patient collide.

In some implementations, the method further includes determining a normalized position value of a tooth contour center for each tooth along a jaw curve; and determining the displacement of the tooth mesh of the primary tooth based at least in part on the normalized position value of the tooth contour center.

In some implementations, determining if the displaced primary tooth collides with at least one secondary tooth of the teeth in the desired position includes determining if at least one tooth contour of the secondary tooth intersects with a tooth contour of the displaced primary tooth.

In some implementations, in response to displacing the tooth mesh of the secondary tooth away from the tooth mesh of the primary tooth by the basic step distance, the method further includes determining that a tooth contour of the displaced secondary tooth intersects with an other tooth contour of an other tooth; and in response to the tooth contour of the displaced secondary tooth intersecting the other tooth contour, repeating until no tooth contours intersect: bisecting a distance of displacement, and determining if the tooth contour of the displaced tooth intersects any other tooth contour.

In some implementations, the method further includes determining an orthodontic treatment for the patient based at least in part on the determined tooth displacement.

In some implementations, the method further includes displaying, on an interactive display system operatively connected to the processor, a model of the teeth and the surrounding gingiva of the patient, the model being based at least in part on the determined tooth displacement, the model being configured to be manipulated by an operator of the interactive display system.

In some implementations, the method further includes determining, in response to manipulation of the model, an orthodontic treatment for the patient based at least in part on the model determined at least in part on the tooth displacement.

In the context of the present specification, unless expressly provided otherwise, a computer system may refer, but is not limited to, an "electronic device", an "operation system", a "system", a "computer-based system", a "controller unit", a "control device" and/or any combination thereof appropriate to the relevant task at hand.

In the context of the present specification, unless expressly provided otherwise, the expression "computer-readable medium" and "memory" are intended to include media of any nature and kind whatsoever, non-limiting examples of which include RAM, ROM, disks (CD-ROMs, DVDs, floppy disks, hard disk drives, etc.), USB keys, flash memory cards, solid state-drives, and tape drives.

In the context of the present specification, a "database" is any structured collection of data, irrespective of its particular structure, the database management software, or the computer hardware on which the data is stored, implemented or otherwise rendered available for use. A database may reside on the same hardware as the process that stores or makes use of the information stored in the database or it may reside on separate hardware, such as a dedicated server or plurality of servers.

In the context of the present specification, unless expressly provided otherwise, the words "first", "second", "third", etc. have been used as adjectives only for the purpose of allowing for distinction between the nouns that they modify from one another, and not for the purpose of describing any particular relationship between those nouns.

Embodiments of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations or embodiments of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

DETAILED DESCRIPTION

Certain aspects and embodiments of the present technology are directed to methods of and systems for developing a more efficient orthodontic treatment for a subject (also referred to herein as a "patient"), which also considers certain safety constraints.

Further, it should be expressly understood that, in the context of the present specification, the term "orthodontic treatment" is broadly referred to as any type of medical intervention aimed at correcting malocclusions associated with the teeth of the patient, including surgical and non-surgical manipulations, such as, but not limited to, using one or more of aligners, brackets, multi-strand wires, strips, retainers, and plates. Further, the orthodontic treatment, as referred to herein, may be determined automatically by a specific software, based on respective image data and input parameters associated with the subject, or semi-automatically with input from a professional practitioner in the field of dentistry (such as an orthodontist, a maxillofacial surgeon, for example).

More specifically, certain aspects and embodiments of the present technology comprise a computer-implemented method for determining a jaw curve of a patient, based on a 3D model thereof, for the purposes of planning an orthodontic treatment. In certain aspects and embodiments of the present technology, the determined jaw curve is used for modeling tooth displacement for (1) minimizing extents of potential collisions between a given tooth and at least one adjacent tooth, while (2) causing a maximum displacement thereof towards a desired position within a subject's arch form in order to aid in achieving safer and more efficient orthodontic treatments for the subject.

Certain non-limiting embodiments of the present technology minimize, reduce or avoid some of the problems noted in association with the prior art. For example, by implementing certain embodiments of the present technology in respect of determining a jaw curve for the patient and tooth displacements modeled in respect thereof, the following advantages may be obtained: modeling more efficient and safer tooth movements of the given tooth in the course of the orthodontic treatment. This is aided, in certain non-limiting embodiments of the present technology, by determining displacement of adjacent teeth to avoid collisions following a desired displacement. In this regard, methods and systems provided herein, according to certain non-limiting embodiments of the present technology, allow reducing an overall duration of the orthodontic treatment and, at the same time, increasing safety thereof. For example, reducing the overall duration of the orthodontic treatment may be achieved by applying a fewer number of orthodontic devices (such as aligners) causing respective tooth movements of the given tooth towards the desired position.

Orthodontic Treatment

Figure 1:
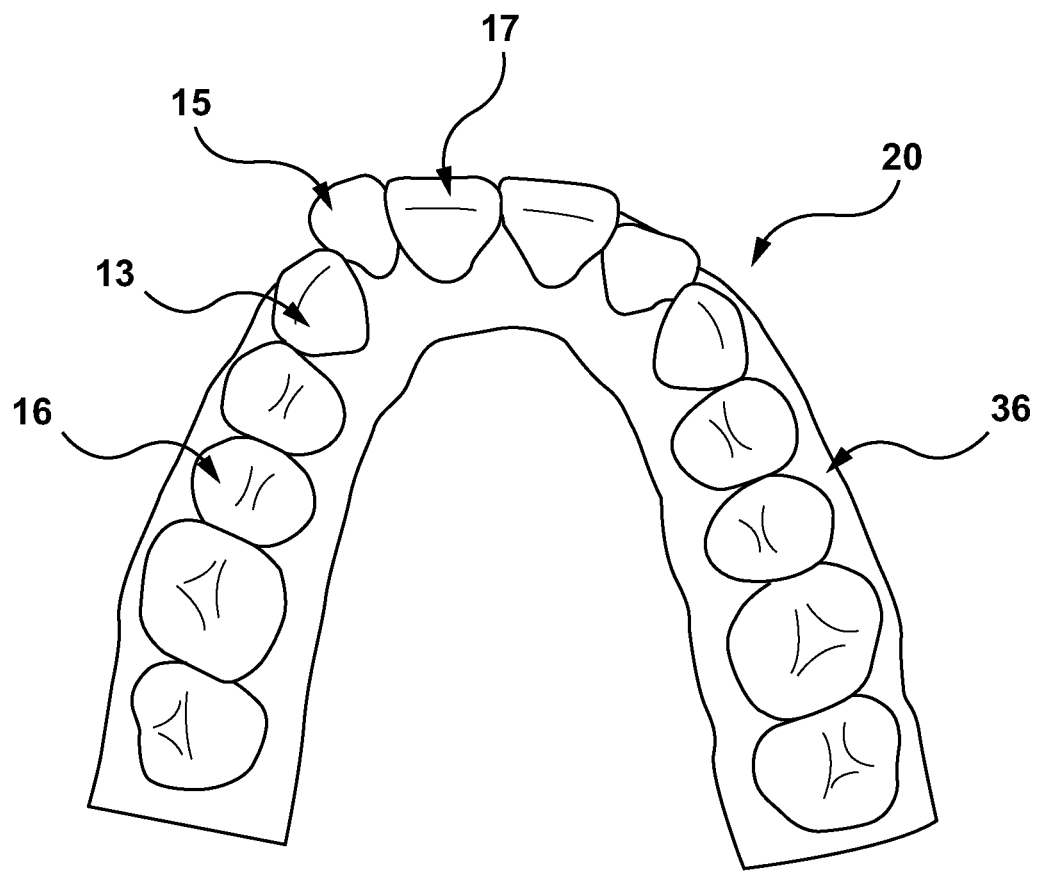
FIG. 1 depicts a bottom view of an upper arch form of a subject exemplifying a misalignment of some of a patient's teeth, in accordance with certain non-limiting embodiments of the present technology.

Referring initially to FIG. 1, there is depicted a bottom view of an upper arch form 20 of the subject, to which certain aspects and non-limiting embodiments of the present technology may be applied.

As it can be appreciated, the upper arch form 20 includes upper teeth 16 and an upper gingiva 36. Further, in the depicted embodiments of FIG. 1, a tooth 15 is misaligned within the upper teeth 16 as it protrudes outwardly relative to its neighboring teeth, a first adjacent tooth 13 and a second adjacent tooth 17. Thus, for correcting the present misalignment of the tooth 15, an orthodontic treatment may be provided to the subject.

In accordance with certain non-limiting embodiments of the present technology, the orthodontic treatment may comprise applying an orthodontic device. Generally speaking, the orthodontic device may be configured to exert a force onto the tooth 15 causing it to move towards an aligned position, that is, in the depicted embodiments of FIG. 1, inwardly between the first adjacent tooth 13 and the second adjacent tooth 17 to align with the first adjacent tooth 13 and the second adjacent tooth 17. In various non-limiting embodiments of the present technology, the orthodontic device may comprise orthodontic appliances of different types, shapes, sizes and configurations, such as those including, without limitation, aligners, brackets, multi-strand wires, strips, retainers, and plates.

In specific non-limiting embodiments of the present the present technology, the orthodontic device may include an aligner. With reference to FIGS. 2A and 2B, there is depicted an aligner 10 applied to at least some of the upper teeth 16, in accordance with certain non-limiting embodiments of the present technology. The aligner 10 comprises an inner surface 12 and an outer surface 14. The inner surface 12 defines a channel 18, which is configured, in some non-limiting embodiments of the present technology, for receiving crown portions of at least some of the upper teeth 16 including the tooth 15, the first adjacent tooth 13, and the second adjacent tooth 17. However, in other non-limiting embodiments of the present technology, the channel 18 of the aligner 10 may be configured to receive crown portions of all of the upper teeth 16. At least one edge of the channel 18 is shaped for following a gum line 22 along the upper gingiva 36.

In accordance with the non-limiting embodiments of the present technology, a size, a form factor (such as a U-shape or a V-shape, for example), and a configuration of the aligner 10, including a material and a thickness thereof, depend generally on a particular malocclusion disorder of the subject (such as the misalignment of the tooth 15 within the upper teeth 16), at which the orthodontic treatment is aimed. However, as an example, in some non-limiting embodiments of the present technology, the thickness of the aligner 10 may be about 0.7 mm. In other non-limiting embodiments of the present technology, the thickness is selected from 0.7 mm, 0.75 mm, 0.8 mm, 0.85 mm, 0.9 mm, 0.95 mm, and 1.0 mm. In yet other non-limiting embodiments of the present technology, the aligner 10 may have regions of variable thickness, such as in interdental regions 24, as an example.

According to certain non-limiting embodiments of the present technology, the aligner 10 may be made of a polymer, such as a thermoplastic material. In other non-limiting embodiments of the present technology, the aligner 10 may be made of poly-vinyl chloride (PVC). In yet other non-limiting embodiments of the present technology, the aligner 10 may be made of polyethylene terephthalate glycol (PETG). Other suitable materials can also be used to form the aligner 10.

It is appreciated that, in accordance with certain non-limiting embodiments of the present technology, the aligner 10 may be used for treating different types of teeth misalignment or malocclusion, including but not limited to one or more of: closing gaps ("space closure"), creating/widening gaps, tooth rotation, tooth intrusion/extrusion, and tooth translation, to name a few. It should further be noted that in certain non-limiting embodiments of the present technology, applying the aligner 10 to the upper teeth 16 may further include applying specific attachments (also known as "fixing blocks") thereto.

As it may become apparent, the aligner 10, may be designed in such a way that its current configuration is representative of a desired position of the upper teeth 16 at a given stage of the orthodontic treatment, which thus allows, due to stiffness properties of the material of the aligner 10, imposing a respective force onto each crown portion of a respective one of the upper teeth 16 appointed for the orthodontic treatment.

Thus, referring back to FIG. 1, in order to cause the tooth 15 to reach the aligned position, first, various configurations of the aligner 10 may be used to sequentially move each one of the upper teeth 16 before the tooth 15 downwardly (in the orientation of FIG. 1), thereby preparing space therefor to be further moved inwardly. Second, the aligner 10 may be configured to cause the tooth 15 to move inwardly, towards the aligned position thereof within the upper teeth 16.

Figure 2:
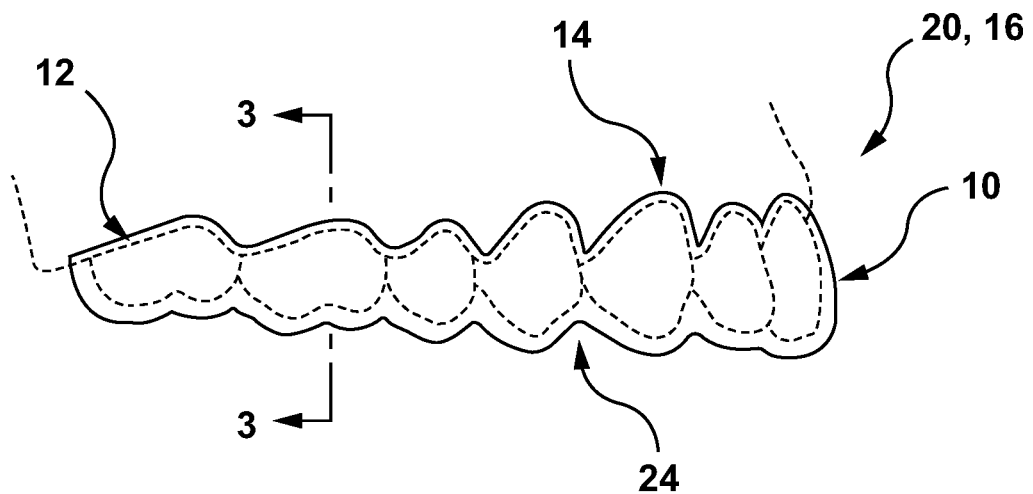
FIGS. 2 and 3 depict side and cross-sectional views, respectively, of a personalized dental appliance applied to the patient's teeth that may be configured to treat the misalignment of the patient's teeth present in FIG. 1, in accordance with certain non-limiting embodiments of the present technology.
Figure 3:
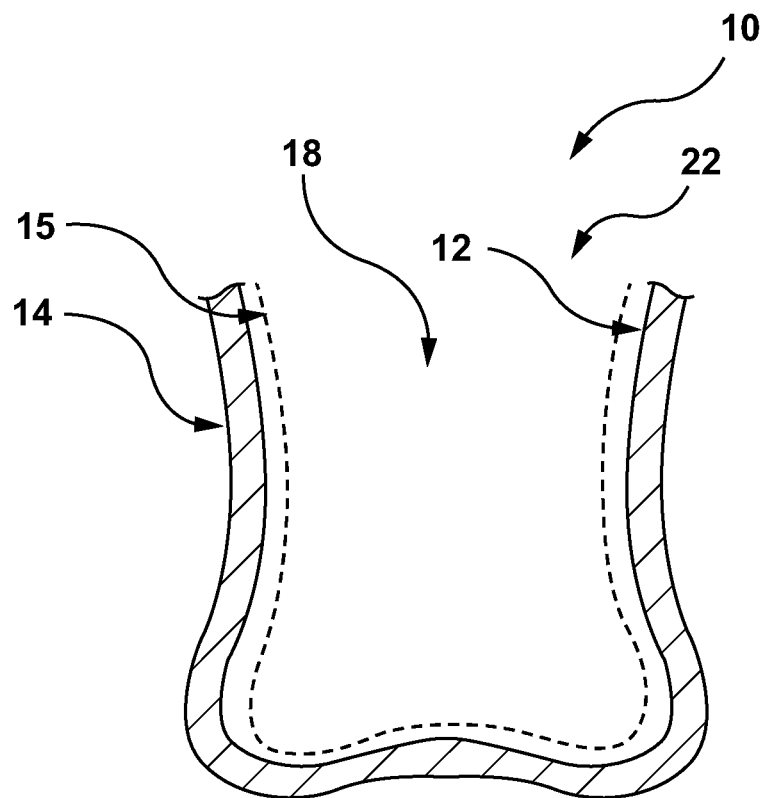
Figure 6:
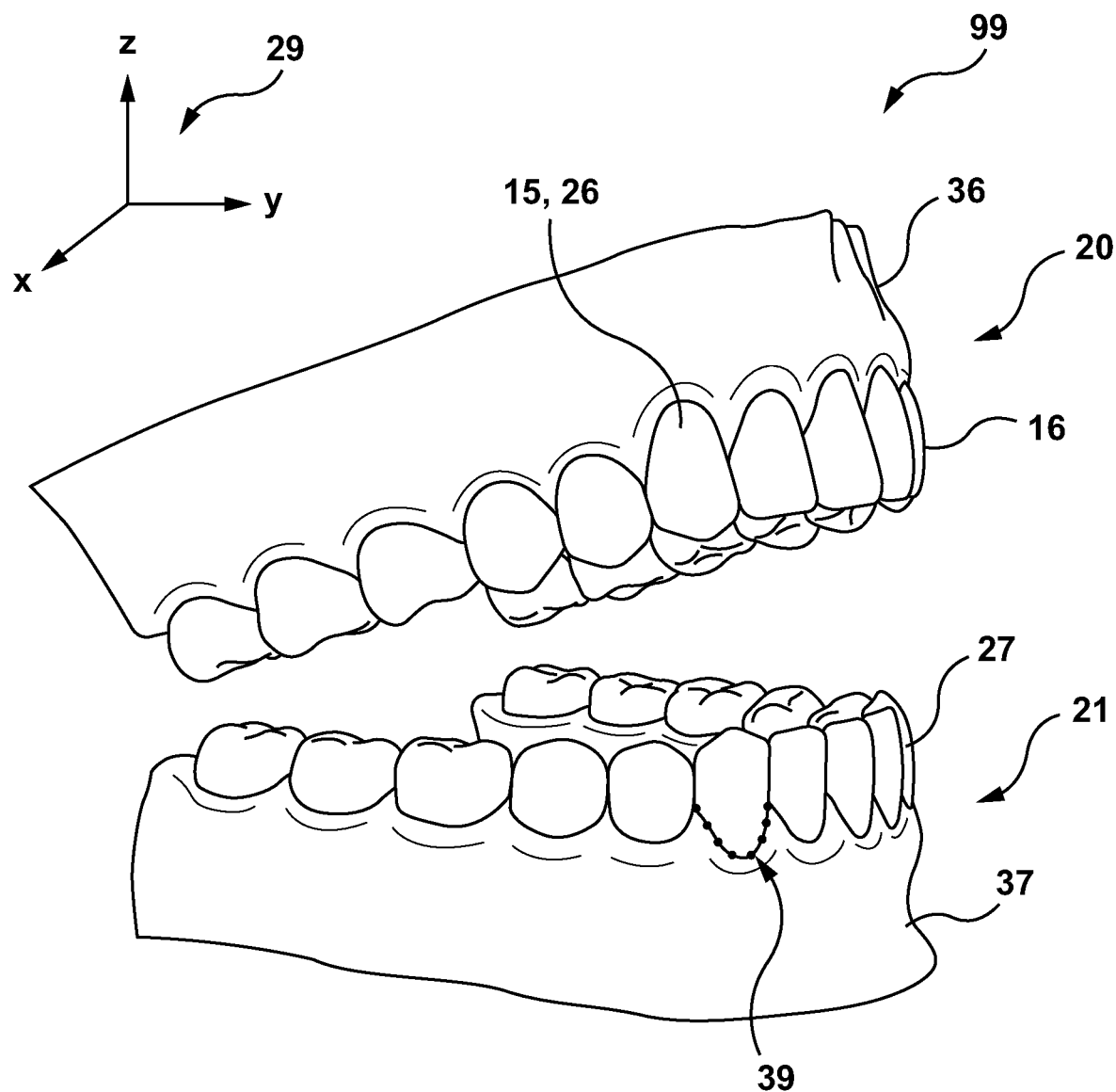
FIG. 6 depicts a perspective view of a 3D model of the upper arch form and a lower arch form of the subject of FIG. 1, in accordance with the non-limiting embodiments of the present technology.

Needles to say that, although in the depicted embodiments of FIGS. 2 and 3 the aligner 10 is configured to be applied onto the upper teeth 16, in other non-limiting embodiments of the present technology, a certain configuration of the aligner 10 may be applied to teeth of a lower arch form (such as a lower arch form 21, 3D representation of which is depicted in FIG. 6) of the subject aimed at respective malocclusion disorders. In the further descriptions below, the present technology is generally in reference to the lower arch form 21, although similarly the methods and systems described also apply to the upper arch form 20, mutatis mutandis.

How the jaw curve is generated and how it may be used for planning the orthodontic treatment, according to certain non-limiting embodiments of the present technology, will be described in greater detail below with reference to FIGS. 8 to 15.

System

Figure 4:
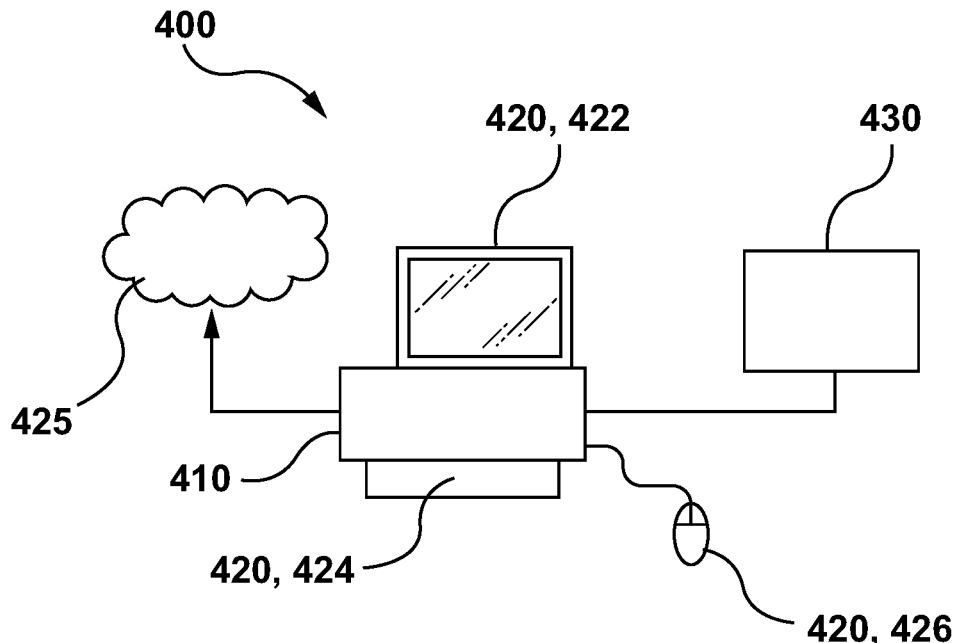
FIG. 4 depicts a schematic diagram of a system for planning an orthodontic treatment, in accordance with certain embodiments of the present technology.
Figure 5:
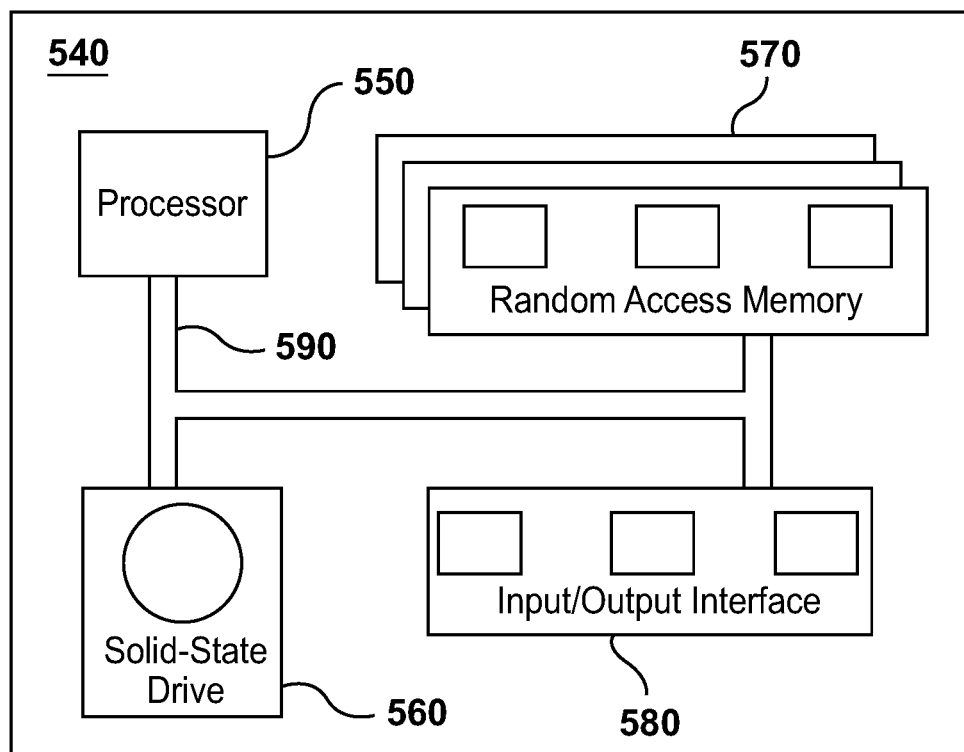
FIG. 5 depicts a schematic diagram of a computing environment of the system of FIG. 4, in accordance with certain embodiments of the present technology.

Referring to FIGS. 4 and 5, there is depicted a schematic diagram of a system 400 suitable for determining the tooth trajectory for planning the orthodontic treatment, in accordance with certain non-limiting embodiments of the present technology.

It is to be expressly understood that the system 400 as depicted is merely an illustrative implementation of the present technology. Thus, the description thereof that follows is intended to be only a description of illustrative examples of the present technology. This description is not intended to define the scope or set forth the bounds of the present technology. In some cases, what is believed to be helpful examples of modifications to the system 400 may also be set forth below. This is done merely as an aid to understanding, and, again, not to define the scope or set forth the bounds of the present technology. These modifications are not an exhaustive list, and, as a person skilled in the art would understand, other modifications are likely possible. Further, where this has not been done (i.e., where no examples of modifications have been set forth), it should not be interpreted that no modifications are possible and/or that what is described is the sole manner of implementing that element of the present technology. As a person skilled in the art would understand, this is likely not the case. In addition, it is to be understood that the system 400 may provide in certain instances simple implementations of the present technology, and that where such is the case they have been presented in this manner as an aid to understanding. As persons skilled in the art would further understand, various implementations of the present technology may be of a greater complexity.

In certain non-limiting embodiments of the present technology, the system 400 of FIG. 4 comprises a computer system 410. The computer system 410 may be configured, by pre-stored program instructions, to perform, based on image data associated with the subject, methods described herein for determining a jaw curve for the subject and/or model movement of one or more teeth along the determined jaw curve, according to certain non-limiting embodiments of the present technology. In some non-limiting embodiments of the present technology, the computer system 410 may further be configured to determine, based at least on the jaw curve and/or modeled tooth displacement, an orthodontic treatment for the subject, as will be described further.

To that end, in some non-limiting embodiments of the present technology, the computer system 410 is configured to receive image data pertaining to the subject or to a given stage of the orthodontic treatment. According to some non-limiting embodiments of the present technology, the computer system 410 may receive the image data via local input/output interface (such as USB, as an example, not separately depicted). In other non-limiting embodiments of the present technology, the computer system 410 may be configured to receive the image data over a communication network 425, to which the computer system 410 is communicatively coupled.

In some non-limiting embodiments of the present technology, the communication network 425 is the Internet and/or an Intranet. Multiple embodiments of the communication network may be envisioned and will become apparent to the person skilled in the art of the present technology. Further, how a communication link between the computer system 410 and the communication network 425 is implemented will depend, inter alia, on how the computer system 410 is implemented, and may include, but is not limited to, a wire-based communication link and a wireless communication link (such as a Wi-Fi communication network link, a 3G/4G communication network link, and the like).

It should be noted that the computer system 410 can be configured for receiving the image data from a vast range of devices. Some of such devices can be used for capturing and/or processing data pertaining to maxillofacial and/or cranial anatomy of the subject. In certain embodiments, the image data received from such devices is indicative of properties of anatomical structures of the subject, including: teeth, intraoral mucosa, maxilla, mandible, temporomandibular joint, and nerve pathways, among other structures. In some non-limiting embodiments of the present technology, at least some of the image data is indicative of properties of external portions of the anatomical structures, for example dimensions of a gingival sulcus, and dimensions of an external portion of a tooth (e.g., a crown of the tooth) extending outwardly of the gingival sulcus. In some embodiments, the image data is indicative of properties of internal portions of the anatomical structures, for example volumetric properties of bone surrounding an internal portion of the tooth (e.g., a root of the tooth) extending inwardly of the gingival sulcus. Under certain circumstances, such volumetric properties may be indicative of periodontal anomalies which may be factored into an orthodontic treatment plan. In some non-limiting embodiments of the present technology, the image data includes cephalometric image datasets. In some embodiments, the image data includes datasets generally intended for the practice of endodontics. In some embodiments, the image data includes datasets generally intended for the practice of periodontics.

In alternative non-limiting embodiments of the present technology, the computer system 410 may be configured to receive the image data associated with the subject directly from an imaging device 430 (shown schematically in FIG. 4) communicatively coupled thereto. Broadly speaking the imaging device 430 may be configured (for example, by a processor 550 depicted in FIG. 5) to capture and/or process the image data of the upper teeth 16 and the periodontium (not depicted) of the subject. In certain non-limiting embodiments of the present technology, the image data may include, for example, one or more of: (1) images of external surfaces of respective crown portions (such as the crown portion 26 of the tooth 15) of the upper teeth 16, (2) images of an external surface of the periodontium including those of the upper gingiva (not depicted), the alveolar maxillary bone (not depicted), and images of superficial blood vessels and nerve pathways associated with the upper teeth 16; and (3) images of an oral region. By doing so, the imaging device 430 may be configured, for example, to capture image data of the upper arch form 20 of the subject. In another example, the imaging device may also be configured to capture and/or process image data of a lower arch form (such as the lower arch form 21 depicted in FIG. 6) associated with the subject without departing from the scope of the present technology. It should be noted that the image data may include two-dimensional (2D) data and/or three-dimensional data (3D). Further, in certain non-limiting embodiments of the present technology, the image data includes 2D data, from which 3D data may be derived, and vice versa.

In some non-limiting embodiments of the present technology, the imaging device 430 may comprise an intra-oral scanner enabling to capture direct optical impressions of the upper arch form 20 of the subject. In a specific non-limiting example, the intraoral scanner can be of one of the types available from MEDIT, corp. of 23 Goryeodae-ro 22-gil, Seongbuk-gu, Seoul, South Korea. It should be expressly understood that the intraoral scanner can be implemented in any other suitable equipment.

In other non-limiting embodiments of the present technology, the imaging device 430 may comprise a desktop scanner enabling to digitize a mold representing the arch forms of the subject. In this regard, the mold may have been obtained via dental impression using a material (such as a polymer, e.g. polyvinyl-siloxane) having been imprinted with the shape of the intraoral anatomy it has been applied to. In the dental impression, a flowable mixture (i.e., dental stone powder mixed with a liquid in certain proportions) may be flowed such that it may, once dried and hardened, form the replica.

In a specific non-limiting example, the desktop scanner can be of one of the types available from Dental Wings, Inc. of 2251, ave Letourneux, Montreal (QC), Canada, H1V 2N9. It should be expressly understood that the desktop scanner can be implemented in any other suitable equipment.

In yet other non-limiting embodiments of the present technology, the imaging device 430 may comprise a cone beam computed tomography (CBCT) scanner. Generally speaking, the CBCT scanner comprises software and hardware allowing for capturing data using a cone-shaped X-ray beam by rotating around the subject's head. This data may be used to reconstruct 3D representations of the following regions of the subject's anatomy: dental (teeth and gum, for example); oral and maxillofacial region (mouth, jaws, and neck); and ears, nose, and throat ("ENT").

In a specific non-limiting example, the CBCT scanner can be of one of the types available from 3Shape, Private Limited Company of Holmens Kanal 7, 1060 Copenhagen, Denmark. It should be expressly understood that the CBCT scanner can be implemented in any other suitable equipment.

Further, it is contemplated that the computer system 410 may be configured for processing of the received image data. The resulting image data of the upper arch form 20 received by the computer system 410 is typically structured as a binary file or an ASCII file, may be discretized in various ways (e.g., point clouds, polygonal meshes, pixels, voxels, implicitly defined geometric shapes), and may be formatted in a vast range of file formats (e.g., STL, OBJ, PLY, DICOM, and various software-specific, proprietary formats). Any image data file format is included within the scope of the present technology. For implementing functions described above, the computer system 410 may further comprise a corresponding computing environment.

With reference to FIG. 5, there is depicted a schematic diagram of a computing environment 540 suitable for use with some implementations of the present technology. The computing environment 540 comprises various hardware components including one or more single or multi-core processors collectively represented by the processor 550, a solid-state drive 560, a random access memory 570 and an input/output interface 580. Communication between the various components of the computing environment 540 may be enabled by one or more internal and/or external buses 590 (e.g. a PCI bus, universal serial bus, IEEE 1394 "Firewire" bus, SCSI bus, Serial-ATA bus, ARINC bus, etc.), to which the various hardware components are electronically coupled.

The input/output interface 580 allows enabling networking capabilities such as wire or wireless access. As an example, the input/output interface 580 comprises a networking interface such as, but not limited to, a network port, a network socket, a network interface controller and the like. Multiple examples of how the networking interface may be implemented will become apparent to the person skilled in the art of the present technology. For example, but without being limiting, the input/output interface 580 may implement specific physical layer and data link layer standard such as Ethernet™, Fibre Channel, Wi-Fi™ or Token Ring. The specific physical layer and the data link layer may provide a base for a full network protocol stack, allowing communication among small groups of computers on the same local area network (LAN) and large-scale network communications through routable protocols, such as Internet Protocol (IP).

According to implementations of the present technology, the solid-state drive 560 stores program instructions suitable for being loaded into the random access memory 570 and executed by the processor 550, according to certain aspects and embodiments of the present technology. For example, the program instructions may be part of a library or an application.

In some non-limiting embodiments of the present technology, the computing environment 540 is implemented in a generic computer system, which is a conventional computer (i.e. an "off the shelf" generic computer system). The generic computer system may be a desktop computer/personal computer but may also be any other type of electronic device such as, but not limited to, a laptop, a mobile device, a smart phone, a tablet device, or a server.

As persons skilled in the art of the present technology may appreciate, multiple variations as to how the computing environment 540 can be implemented may be envisioned without departing from the scope of the present technology.

Referring back to FIG. 4, the computer system 410 has at least one interface device 420 for providing an input or an output to a user of the system 400, the interface device 420 being in communication with the input/output interface 580. In the embodiment of FIG. 4, the interface device is a screen 422. In other non-limiting embodiments of the present technology, the interface device 420 may be a monitor, a speaker, a printer or any other device for providing an output in any form such as an image form, a written form, a printed form, a verbal form, a 3D model form, or the like.

In the depicted embodiments of FIG. 4, the interface device 420 also comprises a keyboard 424 and a mouse 426 for receiving input from the user of the system 400. Other interface devices 420 for providing an input to the computer system 410 can include, without limitation, a USB port, a microphone, a camera or the like.

The computer system 410 may be connected to other users, such as through their respective clinics, through a server (not depicted). The computer system 410 may also be connected to stock management or client software which could be updated with stock when the orthodontic treatment has been determined and/or schedule appointments or follow-ups with clients, for example.

Image Data

As will be described in greater detail below, according to the non-limiting embodiments of the present technology, the processor 550 may be configured to: (1) receive the image data associated with the subject's teeth; (2) based on the received image data, determine, for each tooth, a tooth contour defined by a border between the visible portion of each tooth and the surrounding gingiva, and a jaw curve based at least in part on the tooth contours; and (3) based on the so determined jaw curve, determine the orthodontic treatment for the subject.

According to some non-limiting embodiments of the present technology, having received the image data, the processor 550 may be configured to generate 3D models of arch forms of the subject.

With reference to FIG. 6, there is depicted a perspective view of a 3D model 99 representing a current configuration of the upper arch form 20 (also referred to herein as "maxillary arch form") and the lower arch form 21 (also referred to herein as "mandibular arch form") of the subject, in accordance with the non-limiting embodiments of the present technology.

According to the non-limiting embodiments of the present technology, the upper arch form 20 comprises the upper teeth 16 (also referred to herein as "maxillary teeth") and the upper gingiva 36, and the lower arch form 21 comprises lower teeth 27 (also referred to herein as "mandibular teeth") and a lower gingiva 37. As it can be appreciated, the upper teeth 16 and the lower teeth 27 are represented, in the 3D model 99, by respective crown portions associated therewith. Further, according to certain non-limiting embodiments of the present technology, the processor 550 may be configured to determine a model coordinate system 29 associated with the 3D model 99.

Figure 7:
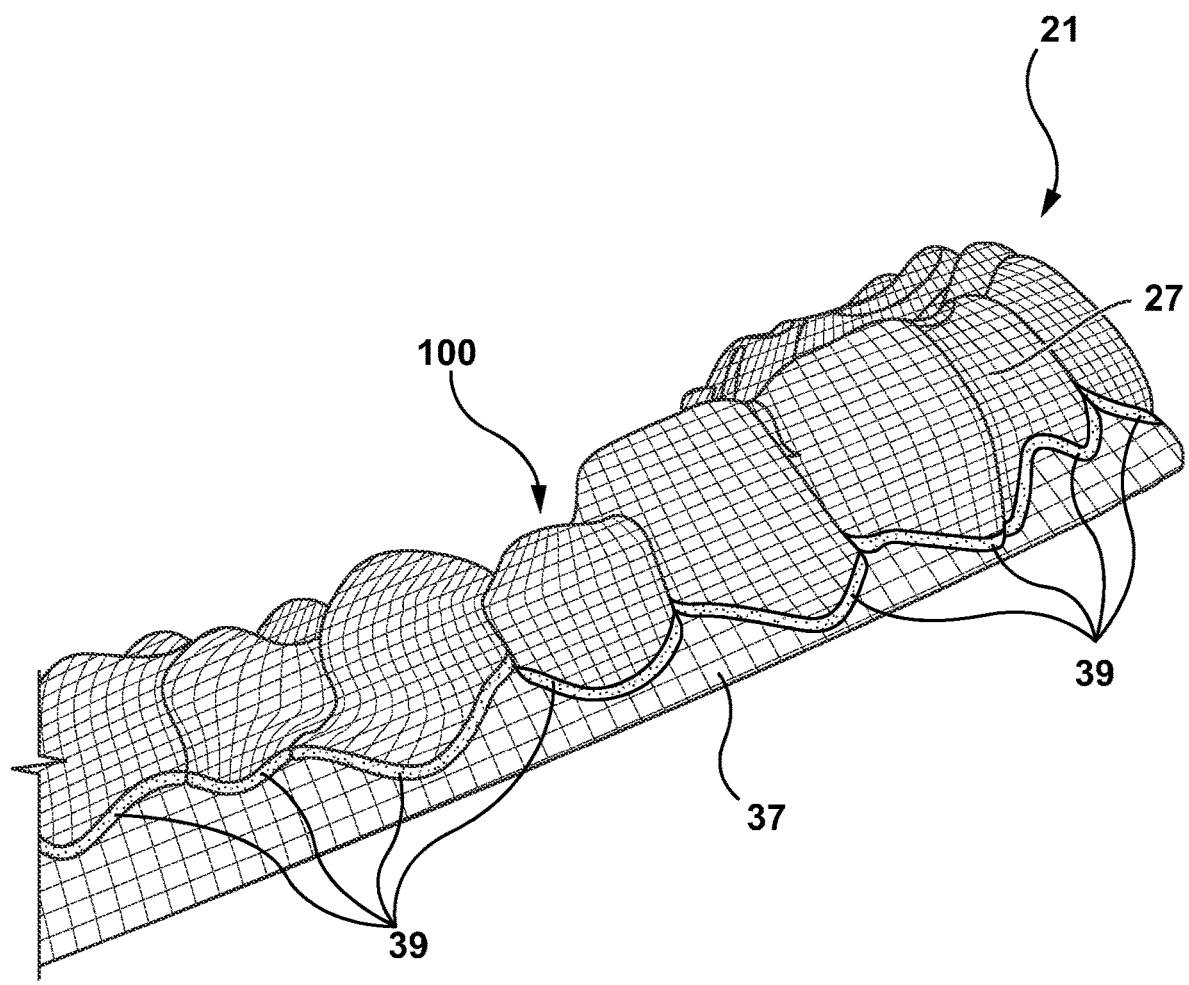
FIG. 7 depicts a perspective view of a 3D tooth and gingiva mesh model of the lower arch form of FIG. 6.

Further, according to certain non-limiting embodiments of the present technology, the processor 550 may be configured to obtain a tooth contour 39 (also referred to as tooth-gingiva boundary or tooth-gingiva contour) for each tooth 16, 27. The tooth contour 39 is the boundary between the visible portion (the crown) of a given tooth 16, 27 and the surrounding gingiva 36, 37. For example, in some non-limiting embodiments of the present technology, after receiving the 3D model 99, the processor 550 may be configured to segment thereon 3D representations of crown portions associated with the respective teeth from each other as well as from an associated gingiva, thereby generating a plurality of so segmented crown portions associated with one of the upper arch form 20 and the lower arch form 21 of the subject. As is illustrated in FIG. 7, in some implementations, the processor 550 may be configured to produce a mesh grid 100 to describe the various surfaces of the upper and/or lower arch forms 20, 21. In some non-limiting implementations, the mesh grid 100 can then be segmented to further determine the tooth contour 39 of each tooth 16, 27. To that end, according to some non-limiting embodiments of the present technology, the processor 550 may be configured to apply one or more approaches to automatic tooth segmentation, for example, one, which is described in a co-owned U.S. Pat. No. 10,695,147, entitled "METHOD AND SYSTEM FOR DENTAL BOUNDARY DETERMINATION", issued Jun. 30, 2020; the content of which is hereby incorporated by reference herein in its entirety.

In additional non-limiting embodiments of the present technology, for a more effective modeling of the movements of the teeth 16, 27 utilizing a determined jaw curve in the course of the orthodontic treatment, the processor 550 may be configured to augment the 3D model 99, which may include, for example: (1) reconstructing a 3D representation of a root portion of one or more teeth (for example, in those embodiments where the imaging device 430 is the intra-oral scanner used for generating the 3D model 99); (2) augmenting a 3D representation of the crown portions of one or more teeth, further including, for example, reconstructing an accurate contour thereof; and (3) reconstructing an augmented gingiva 3D representation (not depicted) of the gingiva 36, 37 corresponding to actual dimensions thereof. To that end, according to certain non-limiting embodiments of the present technology, the processor 550 may be configured to apply one of tooth reconstruction techniques described in a co-owned U.S. patent application Ser. No. 16/936,937 filed on Jul. 23, 2020, entitled "SYSTEMS AND METHODS FOR PLANNING AN ORTHODONTIC TREATMENT", the content of which is incorporated herein by reference.

Given the architecture and the examples provided hereinabove, it is possible to execute a method for determining a jaw curve for a subject's teeth (such as the teeth 27 of the lower arch form 21) for an orthodontic treatment planning for the subject. It should be noted that the methods are described in reference to the lower arch form 21 simply as an example and could be applied to the upper arch form 20, mutatis mutandis. Planning the orthodontic treatment could include, for example, designing one or more of the aligners 10.

Figure 8:
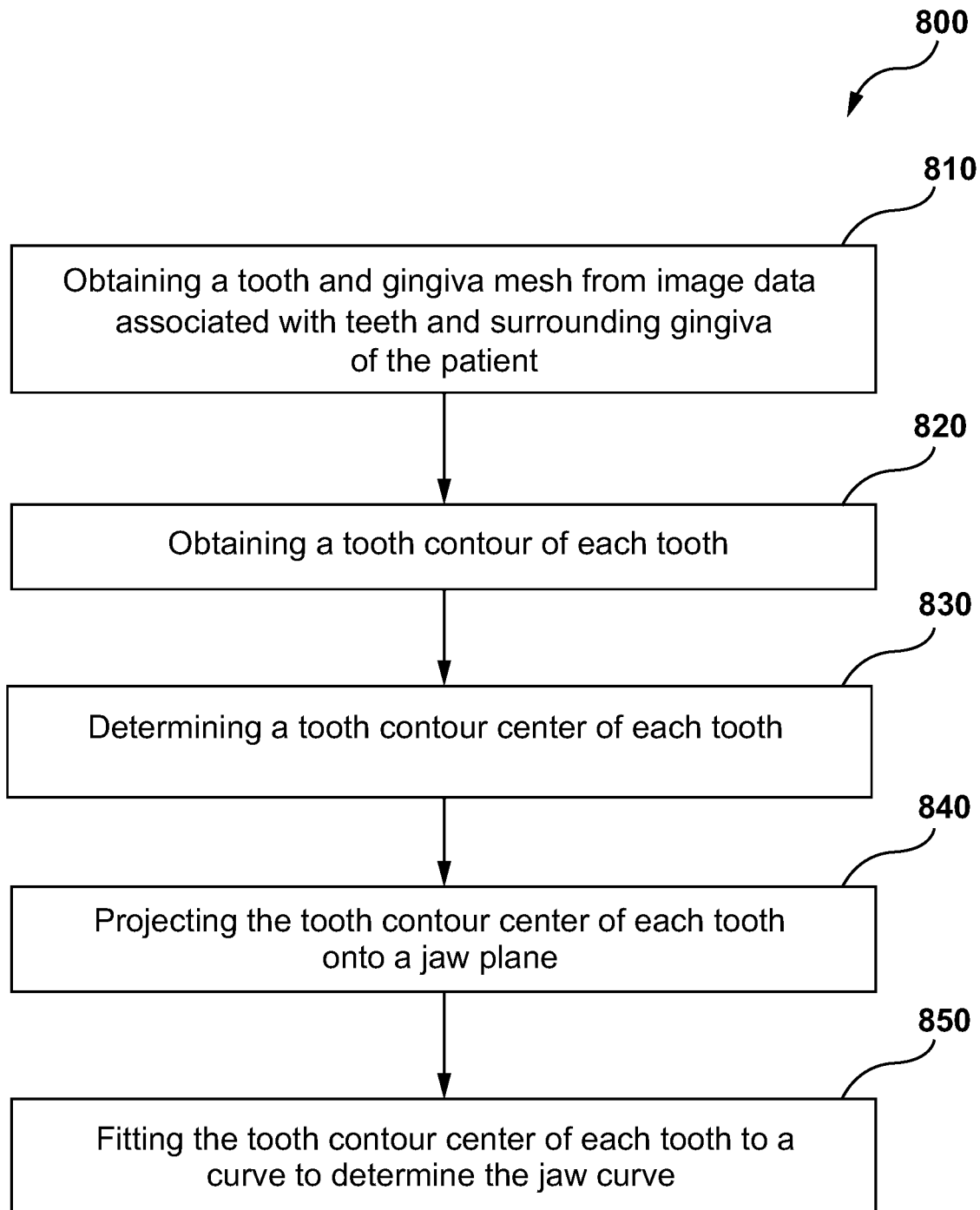
FIG. 8 depicts a flowchart of a method for determining a jaw curve for planning the orthodontic treatment for the subject's teeth of FIG. 1, in accordance with certain embodiments of the present technology.

With reference to FIG. 8, there is depicted a flowchart of a method 800, according to certain non-limiting embodiments of the present technology. The method 800 can be executed by a processor of a computing environment, such as the processor 550 of the computing environment 540. The method 800 is described below with reference to the lower teeth 27 and the surrounding gingiva 37 of the lower arch form 21 for simplicity, but it is contemplated that the method 800 could be utilized for the upper arch form 20 as well.

The method 800 commences, at step 810, with the processor 550 obtaining a tooth and gingiva mesh from image data associated with the subject, such as the lower arch form mesh 100 representing a surface of the lower teeth 27 and the surrounding gingiva 37 illustrated in FIG. 7. In some cases, in certain non-limiting embodiments of the present technology, using the imaging device, the processor 550 may be configured to generate the 3D model representative of the upper arch form 20 and the lower arch form 21 of the subject. In some cases, the tooth and gingiva mesh 100 could be determined prior to commencing the method 800. In such an implementation, the mesh 100 could then be obtained by the processor 550, for instance, by retrieving the mesh 100 from a readable storage device (not shown) communicatively coupled to the processor 550.

In some implementations of the method 800, obtaining the tooth and gingiva mesh 100 includes receiving a scan of the teeth 27 and the surrounding gingiva 37 of the patient to create the image data of the lower arch form 21. Depending on the particular implementation, receiving the scan of the teeth 27 and the surrounding gingiva 37 could include imaging the lower arch form 21 or retrieving the scan from a readable storage device or similar. Having received the scan, the processor 550 could then create the tooth and gingiva mesh 100 from the image data.

Figure 9:
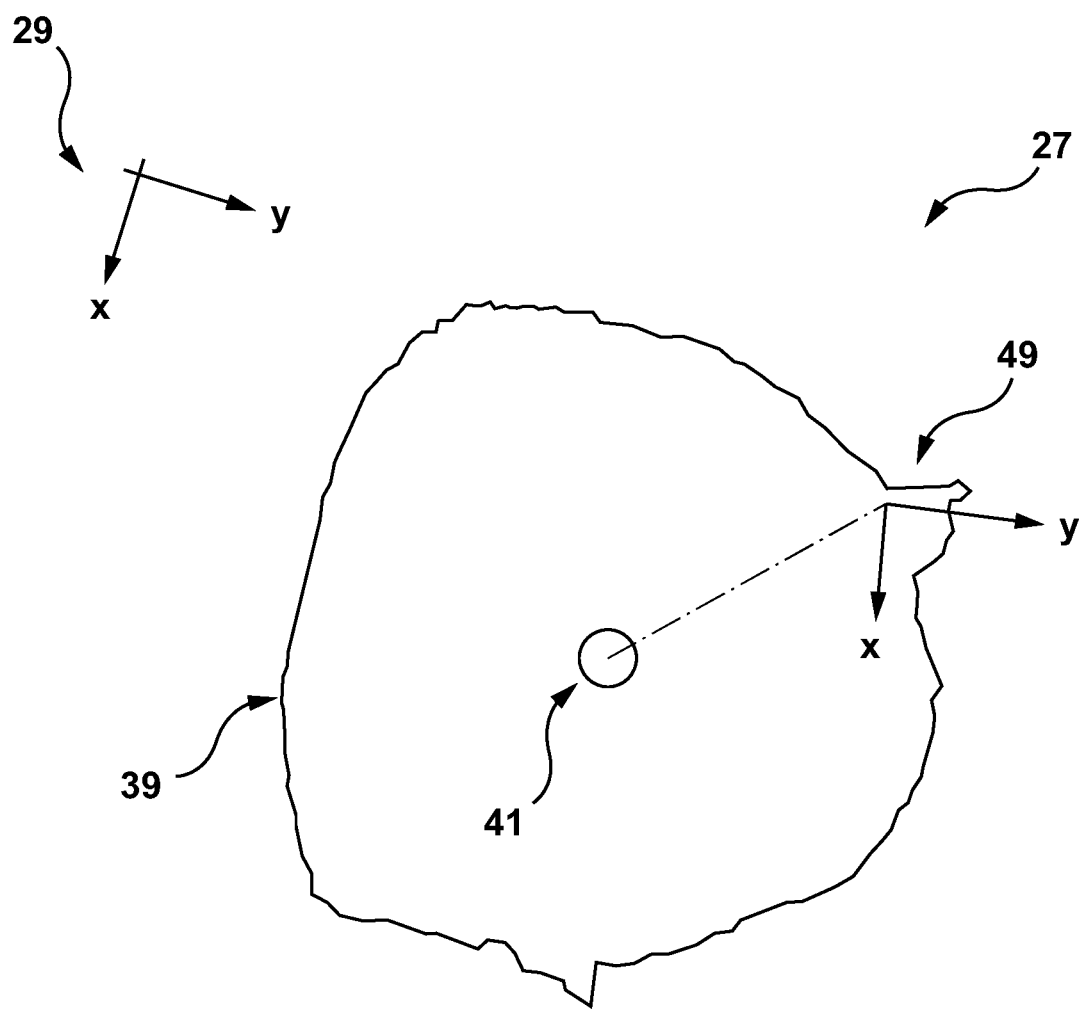
FIG. 9 depicts an example tooth contour of an example tooth of the lower arch form of FIG. 6.

The method 800 continues, at step 820, with obtaining the tooth contour 39 of each tooth 27. An example tooth contour 39 for a given tooth 27 is illustrated in FIG. 9. As is mentioned briefly above, the tooth contour 39 is the border between a visible portion of each tooth 27 (i.e. the crown) and the surrounding gingiva 37. In some implementations, the tooth contour 39 of each tooth 27 could be determined prior to commencement of the method 800. For example, the tooth contours 39 could be determined and stored, such as with the scan of the teeth 27 and the surrounding gingiva 37, and then subsequently retrieved from the readable storage device.

In some implementations of the method 800, obtaining the tooth contour 39 of each tooth 27 includes determining the tooth contour 39 by the processor 550. According to some non-limiting implementations, determining the tooth contours 39 could be performed according to one or more methods proposed by the co-owned Patent '147. For instance, determining one or more tooth contours 39 could include receiving the 3D digital model of a representation of the teeth and the surrounding gingiva of the patient and the defining, for each tooth 27, a plurality of curves crossing a boundary between the tooth 27 and the surrounding gingiva 37 around a perimeter of each tooth 27. Then the method 800 could continue with determining, for each point of each curve, an indication of curvature and determining, for each point and based on the indication of curvature, a predicted likelihood parameter that each point corresponds to the boundary between the teeth 27 and the surrounding gingiva 37. The contour 39 could then be determined by selecting one point of each curve, using a smoothing function and the predicted likelihood parameter, as a boundary point corresponding to the boundary between the teeth 27 and the surrounding gingiva 37. The boundary points surrounding each tooth 27 would thus form the contour 39 of each tooth 27.

Having obtained the tooth contour 39 of each tooth 27, the method 800 then continues, at step 830, with determining a tooth contour center 41 of each tooth 27. An example tooth contour center 41 for the example tooth contour 39 is also illustrated in FIG. 9. It is contemplated that different methods of determining the tooth contour center 41 are within the scope of the present technology. According to some non-limiting implementations, such as is in the illustrated example, determining the tooth contour center 41 includes determining an average point of the tooth contour 39.

Figure 10:
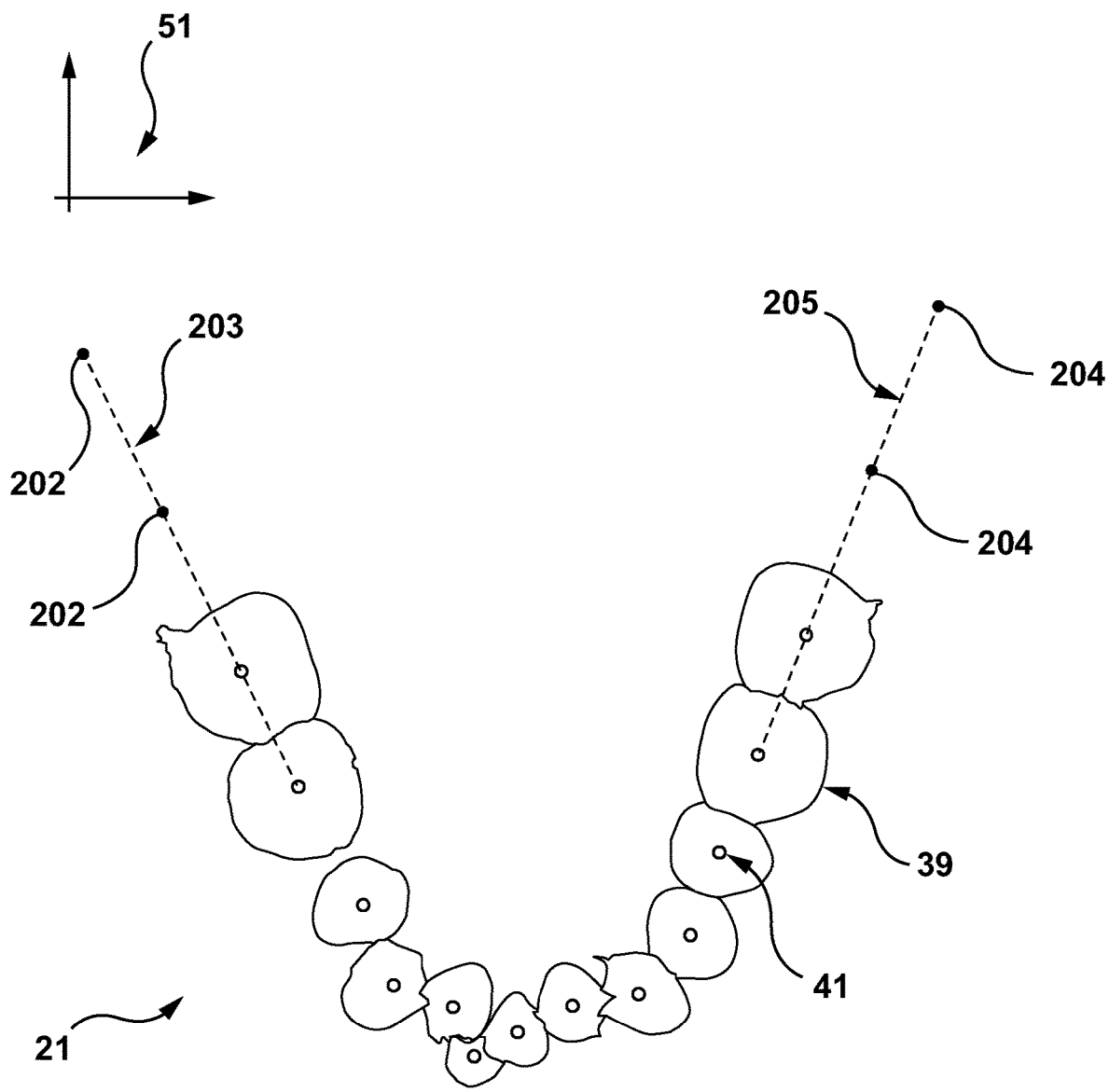
FIG. 10 depicts an example projection of tooth contours of the lower arch form of FIG. 6 onto a jaw plane, in accordance with certain non-limiting embodiments of the present technology.

The method 800 then continues, at step 840, with projecting the tooth contour center 41 of each tooth 27 onto a jaw plane 51. In one non-limiting example, projection of the tooth contours 39 and the tooth contour centers 41 of the lower arch form 21 onto the jaw plane is illustrated in FIG. 10. In some implementations, the jaw plane 51 is defined parallel to an X-Y plane of a tooth coordinate system 49 of each tooth 27 and/or the model coordinate system 29 (see FIGS. 6 and 9). An example projection of the tooth contours 39 of the lower arch form 21 onto the jaw plane 41 is illustrated in FIG. 10. In one non-limiting example, the processor 550 may be configured to determine the coordinate systems 29, 49 such that the X-Y plane thereof is parallel to a transverse plane associated with a subject's skull (not depicted). In another example, the X-Y plane may be parallel to a Frankfort horizontal plane associated with the subject's cranium (not depicted).

Figure 11:
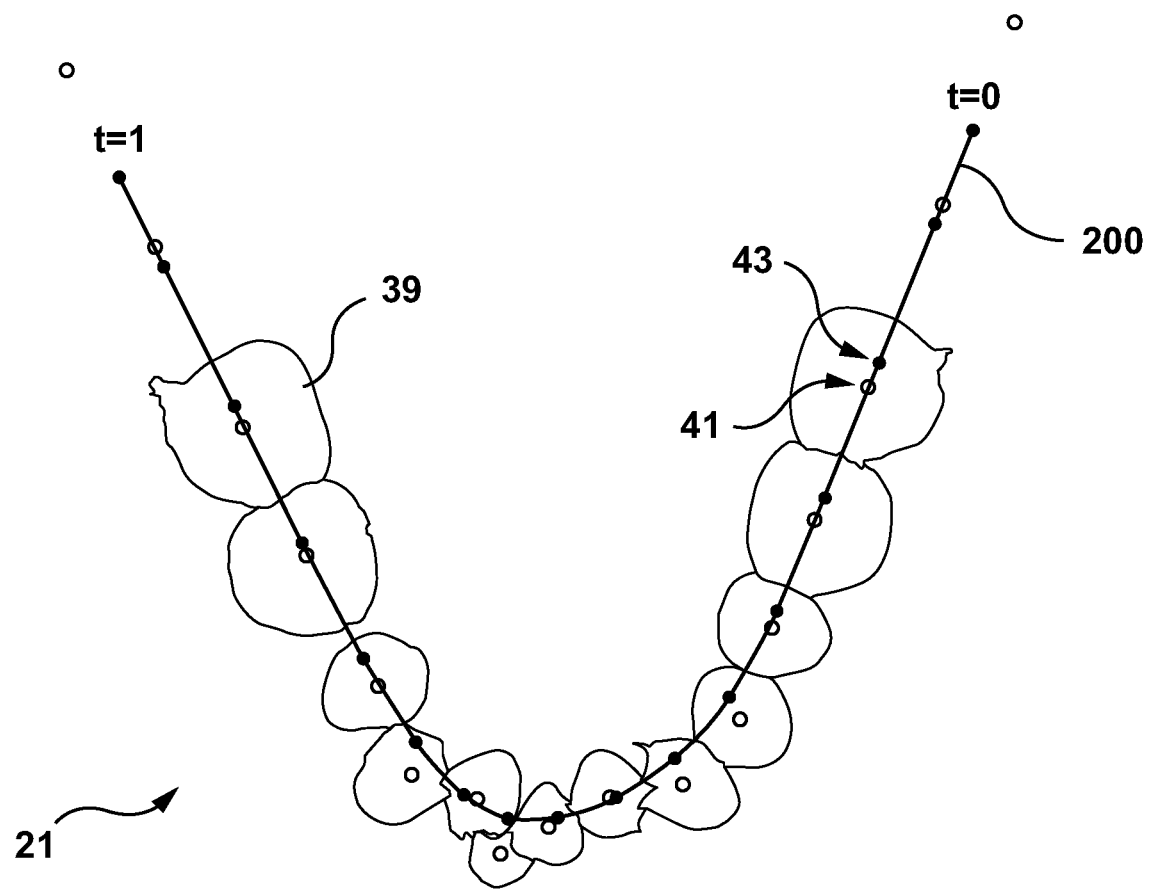
FIG. 11 depicts an example jaw curve fitting of tooth contour centers of the lower arch form of FIG. 6, in accordance with certain non-limiting embodiments of the present technology.

The method 800 then continues, at step 850, with fitting the tooth contour center 41 of each tooth 27 to a curve 200 to determine the jaw curve 200. An example of a jaw curve 200 fitted to the tooth contour centers 41 is illustrated in FIG. 11. As can be noted in the Figure, the jaw curve 200 may not, depending on the particular arrangement of the tooth contour centers 41 of any given patient, align with any or all of the centers 41.

In some non-limiting implementations, the method 800 further includes determining one or more anchor points to aid in curve fitting the jaw curve 200, where fitting the jaw curve 200 includes fitting the anchor points and the tooth contour centers 41. In the non-limiting example illustrated in FIG. 10, two left anchor points 202 and two right anchor points 204 are projected onto the jaw plane 51 following step 840. In some implementations, the left anchor points 202 are determined using a left line segment 203 projected in the jaw plane 51 and extending through the tooth contour center 41 of the two rear-most, left teeth 27 and the right anchor points 204 are determined using a right line segment 205 projected in the jaw plane 51 and extending through the tooth contour center 41 of the two rear-most, right teeth 27.

In some implementations, the nearest left and right anchor points 202, 204 are located at a predetermined distance from the rear-most left and right teeth 27. Similarly, the farther left and right anchor points 202, 204 may be located at two times the predetermined distance from the rear-most left and right teeth 27 in some cases. The exact numerical value of the predetermined distance to the anchor points 202, 204 may depend on the particular fitting algorithm chosen or other factors of the fitting (for example, the actual dimensions of the lower arch form 21, etc.). In some non-limiting examples, the predetermined distance could be about 15 millimeters.

In implementations of the method 800 including determining one or more anchor points 202, 204, fitting the jaw curve 200 further includes fitting the one or more left anchor points 202, the one or more right anchor points 204, in addition to the tooth contour centers 41. The jaw curve 200 is then determined at step 850 by smoothing the line 200 connecting the anchor points 202, 204 and the tooth contour center 41 of each tooth 27. In some non-limiting implementations of the method 800, determining the jaw curve 200 could include fitting the jaw curve 200 to the anchor points 202, 204 and the tooth contour centers 41 based on a parametrical Hermite spline H(t). As the jaw curve 200 has a finite length, in implementations using the Hermite spline H(t), the method 800 could further include determining an average parametrical density for the jaw curve 200.

The method 800 has thus completed determining the jaw curve 200. Having determined the jaw curve 200, the method 800 could perform additional conclusory steps in some non-limiting embodiments of the present technology. In some cases, in response to determining the jaw curve 200, the method 800 could include determining an orthodontic treatment for the patient based at least in part on the determined jaw curve 200. As is described briefly above, an orthodontic treatment plan could include design or selection of one or more aligners 10. In other implementations, additional or alternative treatment appliances or methods could be used in different orthodontic treatment plans.

In some non-limiting implementations, in response to determining the jaw curve 200, the method 800 could also include displaying, on an interactive display system 420 operatively connected to the processor 550 (i.e. the interface device 420), a model of the teeth and the surrounding gingiva of the patient (not separately shown) based at least in part on the determined jaw curve 200. In such cases, the model could be configured to be manipulated by an operator of the interface device 420.

Figure 12:
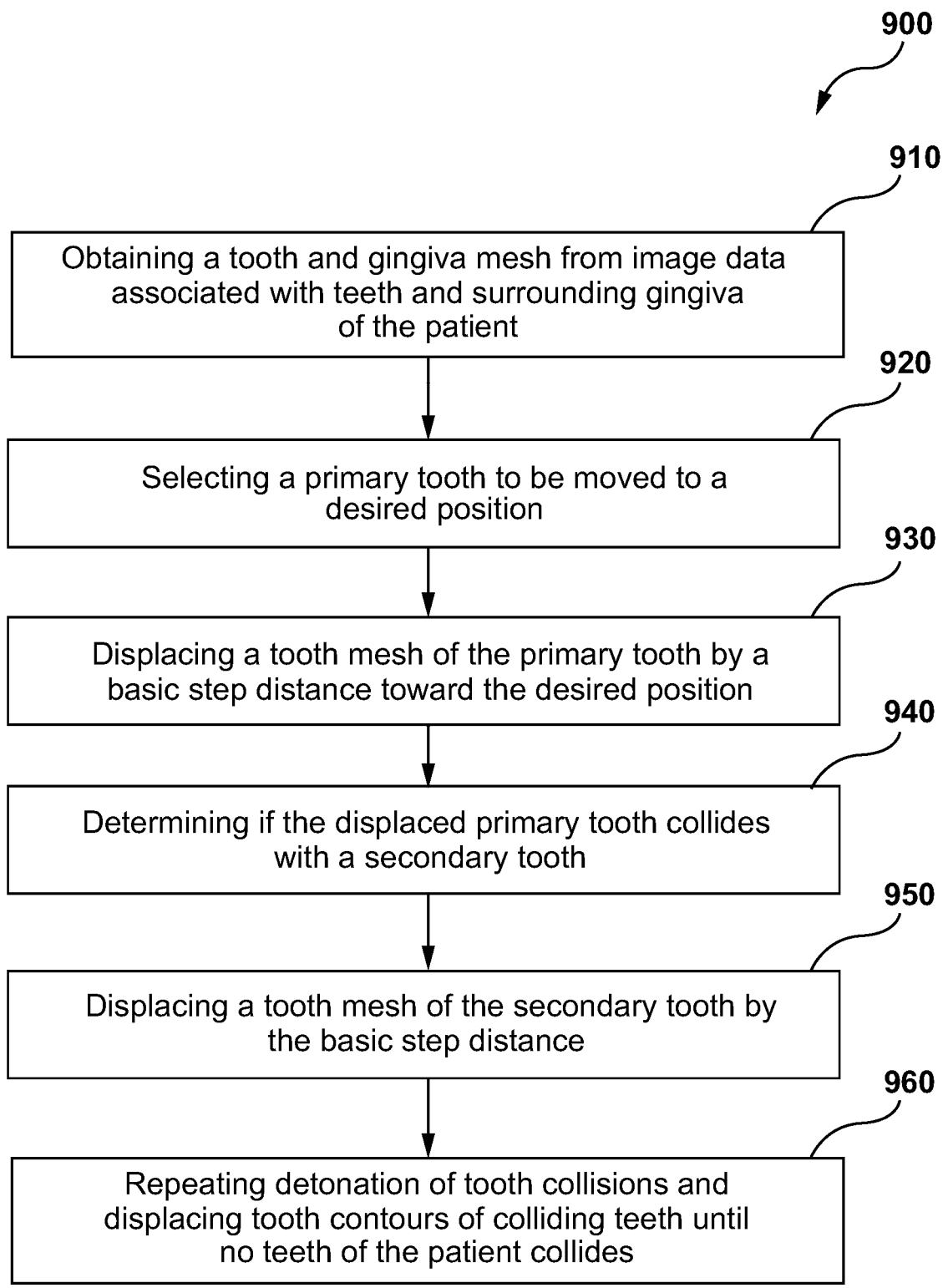
FIG. 12 depicts a flowchart of a method for determining tooth displacement for planning the orthodontic treatment for the subject's teeth of FIG. 1, in accordance with certain embodiments of the present technology.

One non-limiting example method of manipulating the model, based at least in part of the determined jaw curve 200, is described in greater detail below in reference to FIG. 12. In some further non-limiting implementations, the method 800 could include determining, in response to manipulation of the model, an orthodontic treatment for the patient based at least in part on the model determined at least in part on the jaw curve 200. In some cases, manipulation of the model (based at least in part on the determined jaw curve 200) includes simulating movement of one or more teeth 27 along the jaw curve 200. In some non-limiting examples of such simulations, movement of teeth 27 for the simulated movement could be determined as described below in reference to the method 900 of FIG. 12.

Given the architecture and the examples provided hereinabove, it is possible for the processor 550 to execute a method 900 for planning an orthodontic treatment for a patient including determining tooth movement. As with the method 800, the method 900 will be described in reference to the lower arch form 21, having the teeth 27 and surrounding gingiva 37, but it is contemplated that the method 900 could be applied equally to the upper arch form 20, mutatis mutandis. With reference to FIG. 12, there is depicted a flowchart of a method 900, according to certain non-limiting embodiments of the present technology. The method 900 can be executed by a processor of a computing environment, such as the processor 550 of the computing environment 540. As will be made clear below, it is contemplated that the method 900 could, in some non-limiting implementations, be performed following and/or in response to completion of the method 800.

The method 900 commences, at step 910, with obtaining, by the processor 550, the tooth and gingiva mesh 100 from image data associated with teeth 27 and surrounding gingiva 37 of the patient. As is described above in reference to the method 800, depending on the specific implementation, the mesh 100 could be determined prior to commencement of the method 900 (for example during execution of the method 800). In some other non-limiting implementations, obtaining the tooth and gingiva mesh 100 from image data could include calculation and determination of the mesh 100 by the processor 550 at step 910.

Figure 13:
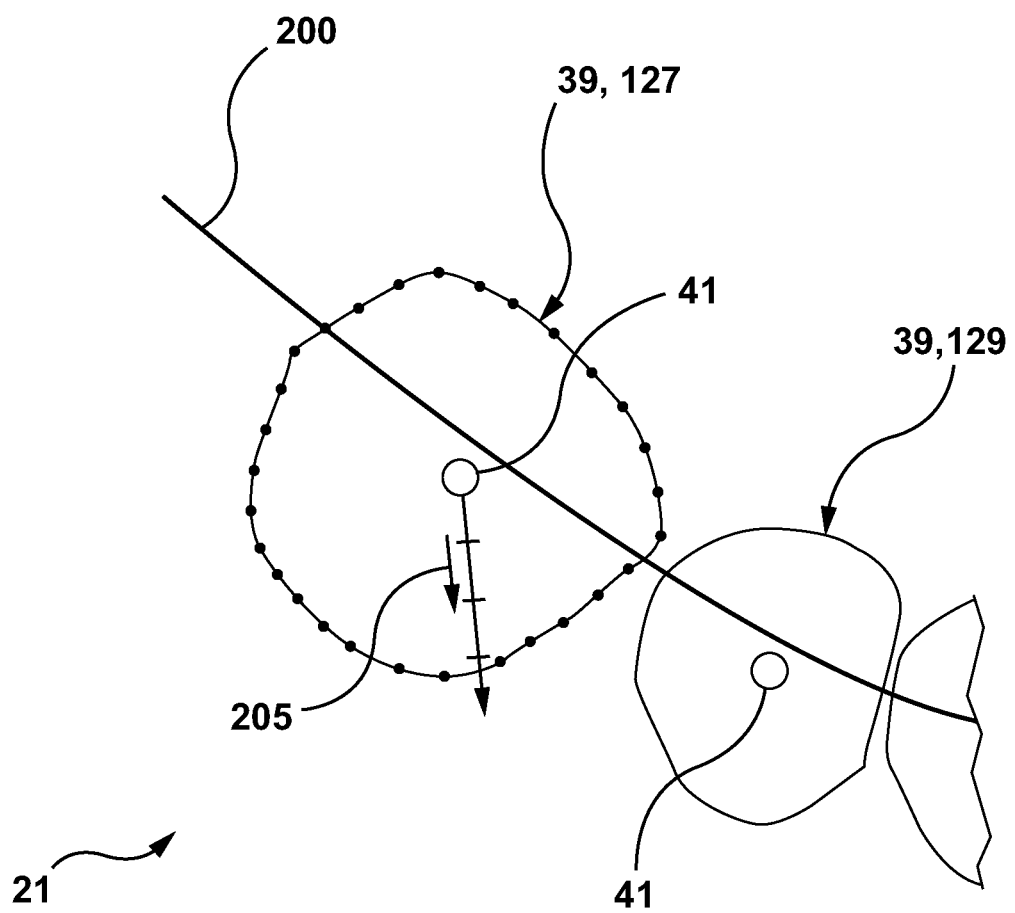
FIG. 13 depicts an example selection of a tooth of the lower arch form of FIG. 6 to be moved toward a desired position, the tooth being selected according to the method of FIG. 12.

The method 900 continues, at step 920, with selecting a primary tooth 127 to be moved to a desired position. Depending on the specific implementation, selection of the primary tooth 127 and selection of the desired position can be performed, for example, through the interface device 420. An example selection of the primary tooth 127 is illustrated in FIG. 13, where a subset of the tooth contours 39 are illustrated for simplicity. The primary tooth 127 is simply a particular chosen tooth and should not be understood to confer any hierarchy of preference of teeth according to the present technology.

Figure 14:
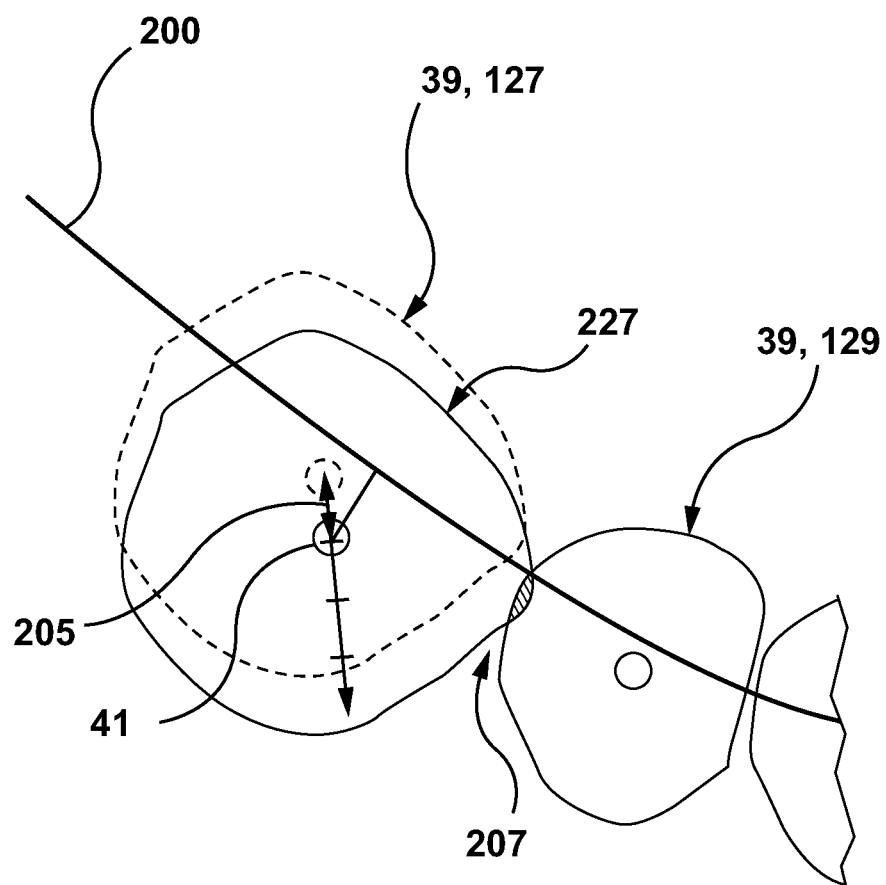
FIG. 14 depicts displacement of the selected tooth of FIG. 13, the tooth being displaced according to the method of FIG. 12.

The method 900 then continues, at step 930, with displacing a tooth mesh of the primary tooth 127 by a basic step distance 205 toward the desired position. According to at least some non-limiting implementations, displacement of the tooth mesh of the primary tooth 127 is determined at least in part on the jaw curve 200 obtained for the teeth 27 of the patient as described above with reference to the method 800. As is illustrated in FIGS. 13 and 14, displacement of the primary tooth 127 to a displaced primary tooth position 227 is performed by moving the tooth contour center 41 by one basic step distance 205. The basic step distance 205 is defined as a maximum allowed transformation for which there is a reasonable expectation that the tooth does not overlap an adjacent tooth upon displacement (translation). The exact numerical value of the basic step distance 205 could depend on the particular implementation, including for example on the physical attributes of the patient. In some non-limiting implementations, the basic step distance 205 could be 2 mm. In some non-limiting implementations, the primary tooth 127 could instead be rotated by a basic step rotation, for which a maximum rotation angle could limit step size of tooth rotation. As one non-limiting example, the basic step rotation could be 2 degrees in some implementations.

In at least some non-limiting implementations, the basic step size (either the basic step distance 205 or the basic step rotation) could be calculated at least in part based on the average parametrical density along the jaw curve 200, described above. In such a case, the exact numerical value of the basic step size could vary depending on the exact position of a given tooth 27 along the jaw curve 200.

The method 900 then continues, at step 940, with determining if the displaced primary tooth 227 collides with at least one secondary tooth 129. As is the case for the primary tooth 127, 227, the nomenclature of "secondary" tooth is not intended to qualify the tooth in any manner, other than it is not the tooth being voluntarily moved to a desired position in the current iteration of the method 900. As is illustrated in FIG. 14, an example movement by one basic step distance 205 of the displaced primary tooth 227 has caused an overlap portion 207 between the displaced primary tooth 227 and one adjacent secondary tooth 129.

Determination that the displaced primary tooth 227 collides with at least one secondary tooth 129 can be done by a number of methods and need not limit the scope of the present disclosure. In some non-limiting implementations, determining if the displaced primary tooth 227 collides with at least one secondary tooth 129 could include determining that the tooth contour 39 of the secondary tooth 129 intersects with the tooth contour 39 of the displaced primary tooth 227.

Figure 15:
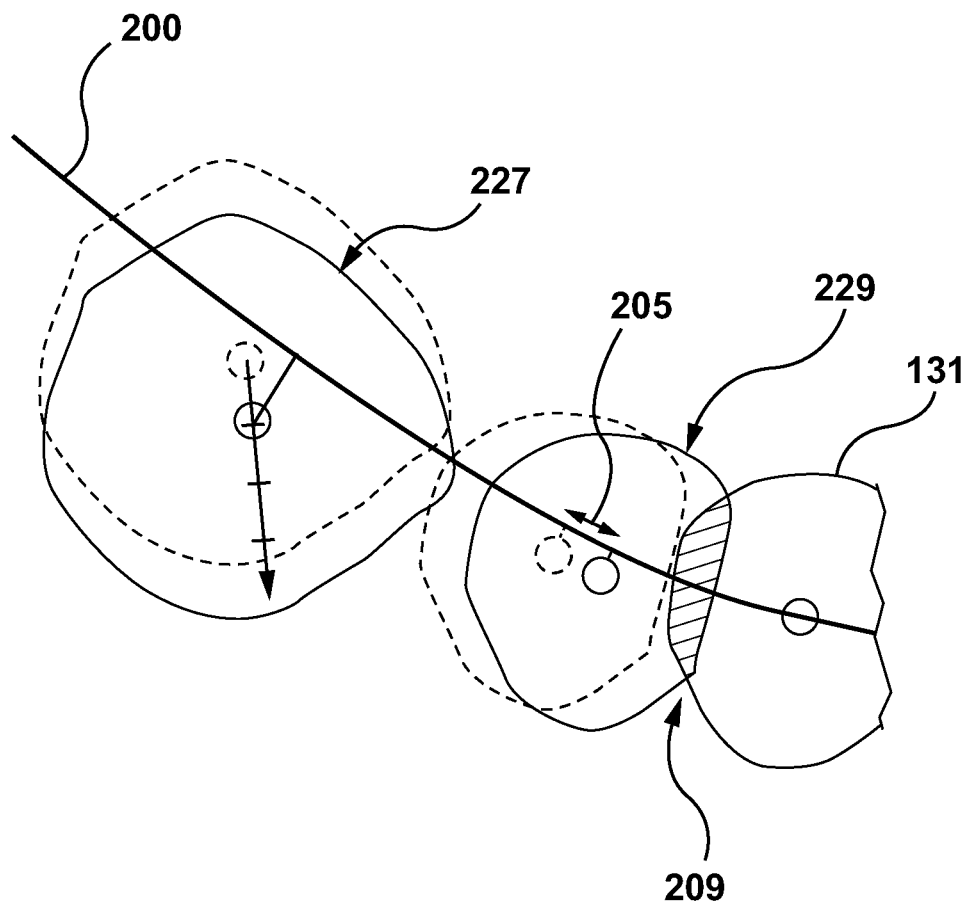
FIG. 15 depicts further displacement of teeth along the jaw curve, the tooth being displaced according to the method of FIG. 12.

Since the overlap portion 207 of the tooth contours of the displaced primary tooth 227 and the secondary tooth 129 represent a likely collision between these teeth 227, 129, the method 900 then reacts to correct this potential collision. In response to the displaced primary tooth 227 colliding with one or more secondary teeth 129, the method 900 then continues, at step 950, with displacing the tooth mesh of the secondary tooth 129 away from the tooth mesh of the displaced primary tooth 227 by the basic step distance 205. As is illustrated in FIG. 15, in some implementations, the tooth mesh of the secondary tooth 129 can be moved along the jaw curve 200.

In some non-limiting implementations, and as is the case in the illustrated example, the method 900 could further include determining that the tooth contour 39 of the displaced secondary tooth 229 intersects with the tooth contour 39 of an other tooth 131. In such a case, the steps of moving the newly-collided with tooth 131 by the basic step distance 205 and inspecting for possible collisions could be repeated until no tooth contour 39 along the jaw curve 200 has any overlap portions.

In some non-limiting implementations, in response to the tooth contour 39 of the displaced secondary tooth 229 intersecting the tooth contour 39 of the other tooth 131, the method 900 could further include bisecting a distance of displacement. The secondary tooth 129 could then be displaced by half of the basic step distance 205 and the method 900 could then repeat verifying if the tooth contour 39 of the displaced secondary tooth 229 is in a position of possible overlap and collision. In some cases, it is also contemplated that the method 900 could include bisecting the displacement distance for the primary tooth 127 after having detected a possible collision with the secondary tooth 129. After having bisected the displacement distance and repeating the displacement of the secondary tooth 129 (or the primary tooth 127), the method 900 could then, in some cases, continue with determining if the tooth contour 39 of the displaced tooth intersects any other tooth contour 39. In some non-limiting implementations, the method 900 could repeat the processing of bisecting displacement distance and re-evaluating tooth contours 39 for overlap and possible collision until no tooth contours 39 intersect.

The method 900 then continues, at step 970, with repeating determination of tooth collisions, as is done at step 940, and displacing tooth contours of colliding teeth 27, as is done at step 950, until no teeth 27 collide. In some implementations, the primary tooth 127 may only need one displacement by the basic step distance 205, and the method 900 could conclude. In some implementations, however, the method 900 could recommence at step 930 with moving the displaced primary tooth 227 by another basic step distance 205, and repeating the steps 940, 950, 960 as before.

In some non-limiting implementations of the present technology, the method 900 could further include determining a normalized position value of the tooth contour center 41 for each tooth along the jaw curve 200. The normalized positions 43 for each tooth contour 39 are illustrated in FIG. 11, where each tooth contour 39 is assigned a position value between 0 and 1 to represent its position relative to the ends of the jaw curve 200. In some implementations, the normalized positions 43 could be calculated at least in part on the average parametrical density of the jaw curve 200, determined by the Hermite spline H(t) fitting function mentioned above. In some non-limiting implementations, the displacement of the tooth mesh of the primary tooth 127 could be based at least in part on the normalized position value of the tooth contour center 41 and/or the tooth contour 39.

In some implementations, the method 900 further continues with determining an orthodontic treatment for the patient based at least in part on the determined tooth displacement determined in previous steps of the method 900.

In some non-limiting implementations, the method 900 could also further include displaying, on an interactive display system, such as the interface device 420 operatively connected to the processor 550, a model of the teeth 27 and the surrounding gingiva 37 of the patient, the model being based at least in part on the tooth displacement determined and simulated during the method 900. Using the interface device 420, the model could further be configured to be manipulated by an operator of the interface device 420 and/or the computer system 410.

In some further implementations, the method 900 could also include determining the orthodontic treatment for the patient based at least in part of the model configured to be manipulated by the operator. For example, the orthodontic treatment could be based one or more intermediate steps or a final arrangement of tooth displacement, triggered by manipulation of the operator of the model and as determined by the process described by the method 800 and/or the method 900 above.

The method 900 hence terminates.

It should be expressly understood that not all technical effects mentioned herein need to be enjoyed in each and every embodiment of the present technology.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

The invention claimed is:

1. A method for determining a jaw curve for orthodontic treatment planning for a patient, the method being executable by a processor, the method comprising:
    obtaining a tooth and gingiva mesh from image data associated with teeth and surrounding gingiva of the patient, the mesh being representative of a surface of the teeth and the surrounding gingiva;
    obtaining a tooth contour of each tooth, the tooth contour being defined by a border between a visible portion of each tooth and the surrounding gingiva;
    determining a tooth contour center of each tooth, the tooth contour center of a given tooth being an average point of the tooth contour of the given tooth;
    projecting the tooth contour center of each tooth onto a jaw plane; and
    fitting the tooth contour center of each tooth to a curve to determine the jaw curve.

2. The method of claim 1, further comprising:
    determining at least one left anchor point and at least one right anchor point on the jaw plane; and
    fitting the curve to determine the jaw curve includes fitting the at least one left anchor point, the at least one right anchor point, and the tooth contour center of each tooth to determine the jaw curve.

3. The method of claim 2, wherein:
    determining the at least one left anchor point comprises:
        determining a left line segment extending through the tooth contour center of two rear-most, left teeth, the left line segment being projected in the jaw plane, and
        locating a left anchor point on the left line segment at a predetermined distance from a rear-most one of the two rear-most, left teeth; and
    determining the at least one right anchor point comprises:
        determining a right line segment extending through the tooth contour center of two rear-most, right teeth, the right line segment being projected in the jaw plane, and
        locating a right anchor point on the right line segment at the predetermined distance from a rear-most one of the two rear-most, right teeth.

4. The method of claim 3, wherein:
    the left anchor point is a first left anchor point;
    the right anchor point is a first right anchor point;
    determining the at least one left anchor point further comprises:
        determining a second left anchor point on the left line segment, the second left anchor point being located at the predetermined distance rearward of the first left anchor point along the left line segment; and
    determining the at least one right anchor point further comprises:
        determining a second right anchor point on the right line segment, the second right anchor point being located at the predetermined distance rearward of the first right anchor point along the right line segment.

5. The method of claim 3, wherein a magnitude of the predetermined distance is greater than zero, such that:
    the left anchor point is positioned separate and distant from the rear-most one of the two rear-most left teeth; and
    the right anchor point is positioned separate and distant from the rear-most one of the two rear-most right teeth.

6. The method of claim 2, wherein fitting the at least one left anchor point, the at least one right anchor point, and the tooth contour center of each tooth to determine the jaw curve comprises determining the jaw curve based on a parametrical Hermite spline H(t).

7. The method of claim 6, further comprising determining an average parametrical density for the jaw curve.

8. The method of claim 2, wherein fitting the at least one left anchor point, the at least one right anchor point, and the tooth contour center of each tooth to determine the jaw curve comprises smoothing a line connecting the at least one left anchor point, the at least one right anchor point, and the tooth contour center of each tooth.

9. The method of claim 1, wherein:
    obtaining the tooth contour of each tooth comprises determining the tooth contour of each tooth; and
    determining the tooth contour of the teeth of the patient comprises:
        receiving a three-dimensional (3D) digital model of a representation of the teeth and the surrounding gingiva of the patient;

defining, for each tooth of the teeth of the patient, a plurality of curves, wherein each curve of the plurality of curves crosses the boundary between the teeth and the surrounding gingiva;

determining, for each point of a plurality of points of each of the plurality of curves, an indication of curvature of the respective curve at each point;

determining, for each point of the plurality of points and based on the indication of curvature corresponding to the respective point, a predicted likelihood parameter that each point corresponds to the boundary between the teeth and the surrounding gingiva; and selecting, for each curve of the plurality of curves, using a smoothing function and the predicted likelihood parameter, a single point, of the plurality of points, on the respective curve as a boundary point corresponding to a boundary between the teeth and the surrounding gingiva of the patient.

10. The method of claim 1, further comprising:
determining, in response to determining the jaw curve, an orthodontic treatment for the patient based at least in part on the determined jaw curve.

11. The method of claim 1, further comprising:
displaying, on an interactive display system operatively connected to the processor, a model of the teeth and the surrounding gingiva of the patient, the model being based at least in part on the determined jaw curve, the model being configured to be manipulated by an operator of the interactive display system.

12. The method of claim 11, further comprising:
determining, in response to manipulation of the model, an orthodontic treatment for the patient based at least in part on the model determined at least in part on the jaw curve.

13. The method of claim 1, further comprising simulating movement of at least one tooth along the jaw curve.

* * * * *